April 21, 1970     D. M. COLLINS ET AL     3,508,037
DECIMAL ADD/SUBTRACT CIRCUITRY
Filed Jan. 30, 1967     11 Sheets-Sheet 1
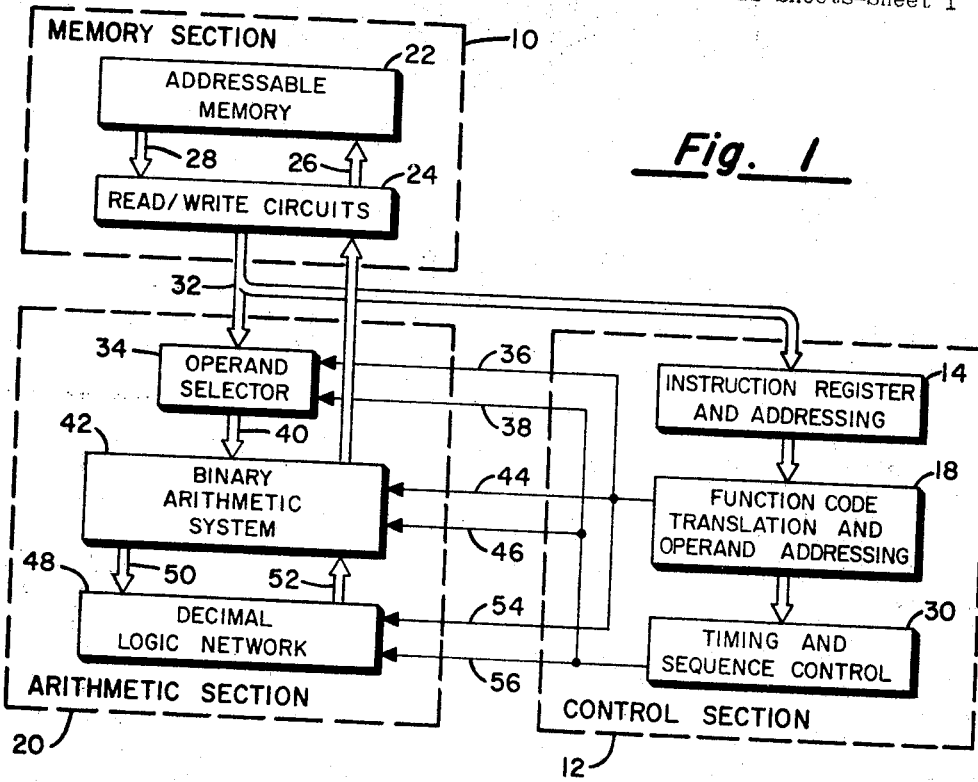
_Fig. 1_
| f | j | k | b | y |
|---|---|---|---|---|
| $2^{29}$---$2^{24}$ | $2^{23}$-$2^{21}$ | $2^{20}$-$2^{18}$ | $2^{17}$-$2^{15}$ | $2^{14}$----------$2^{0}$ |
BASIC INSTRUCTION WORD FORMAT
_Fig. 2_
| f | sf | b | y |
|---|---|---|---|
| 29----24 | 23--------18 | 17---15 | 14-----------0 |
DECIMAL INSTRUCTION WORD FORMAT
_Fig. 3_
INVENTORS
DAVID M. COLLINS
GARY J. IVERSON
BY *Charles C. Johnson*
ATTORNEY

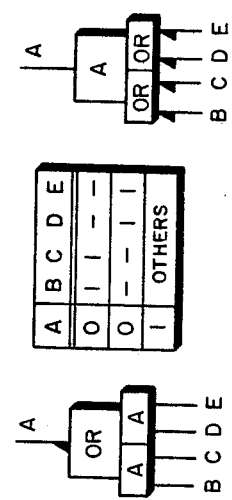
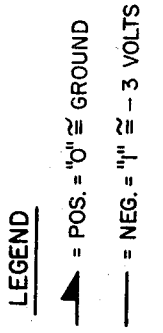
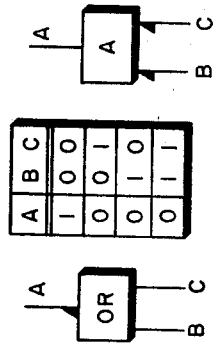
Fig. 5 — DECIMAL OPERAND FORMAT
$D_j$ = BINARY CODED DECIMAL DIGIT WHERE j = DIGIT POSITION 0 THROUGH n.
S = SIGN
= 1 = POSITIVE
= 0 = NEGATIVE
Z = ZONE BITS
= 11 = FIELDATA
= 00 = BCD
LEGEND
▲ = POS. = "0" ≅ GROUND
— = NEG. = "1" ≅ −3 VOLTS
Fig. 4a, Fig. 4b, Fig. 4c, Fig. 4d, Fig. 4e, Fig. 4f April 21, 1970     D. M. COLLINS ET AL     3,508,037
DECIMAL ADD/SUBTRACT CIRCUITRY
Filed Jan. 30, 1967     11 Sheets-Sheet 3

April 21, 1970  D. M. COLLINS ET AL  3,508,037

DECIMAL ADD/SUBTRACT CIRCUITRY

Filed Jan. 30, 1967  11 Sheets-Sheet 4

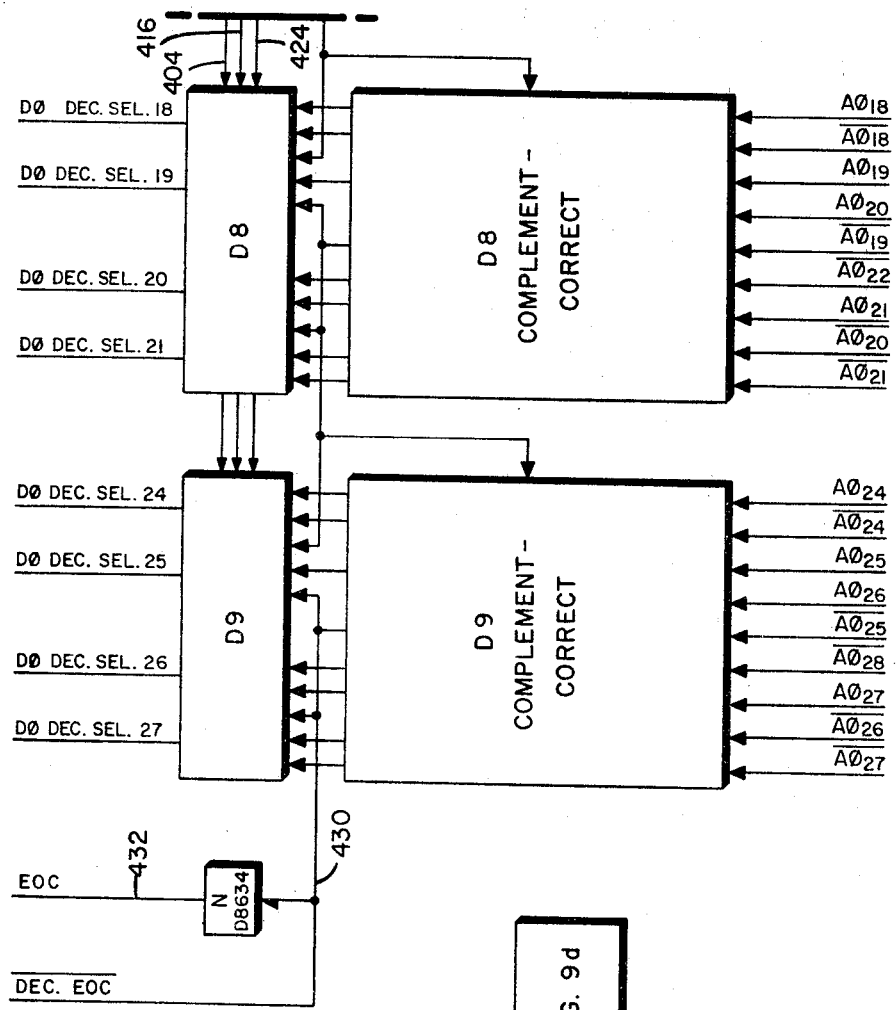

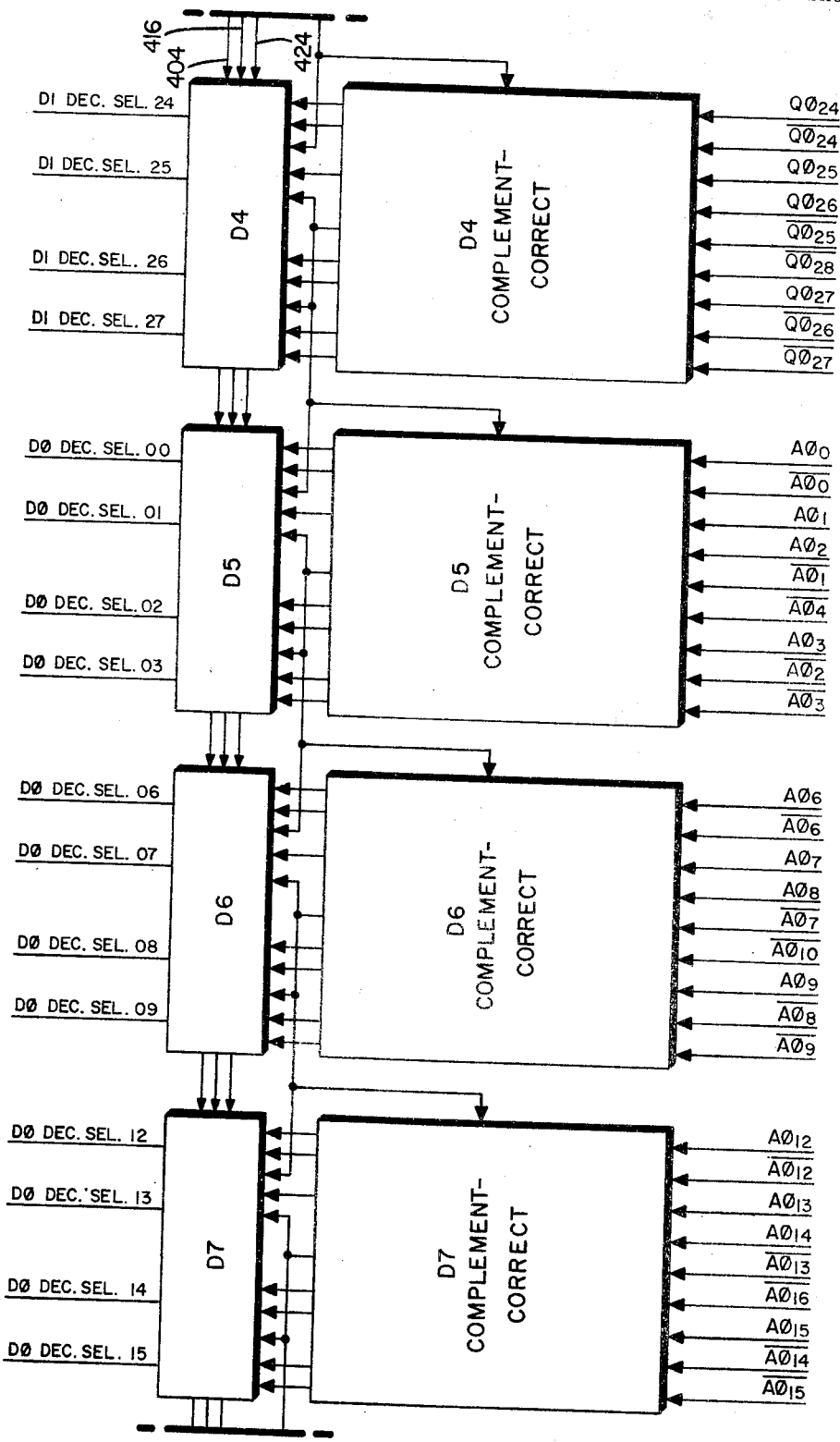

April 21, 1970 D. M. COLLINS ET AL 3,508,037
DECIMAL ADD/SUBTRACT CIRCUITRY
Filed Jan. 30, 1967 11 Sheets-Sheet 11

Fig. 9d

United States Patent Office 3,508,037
Patented Apr. 21, 1970

3,508,037
DECIMAL ADD/SUBTRACT CIRCUITRY
David M. Collins, St. Paul Park, and Gary J. Iverson, White Bear Lake, Minn., assignors to Sperry Rand Corporation, New York, N.Y., a corporation of Delaware
Filed Jan. 30, 1967, Ser. No. 612,479
Int. Cl. G06f 7/385
U.S. Cl. 235—159                                        19 Claims

ABSTRACT OF THE DISCLOSURE

This disclosure relates to an arithmetic system for adding or subtracting a pair of decimal operands, where the decimal digits of each of the operands are expressed in binary coded form. The operands, in addition to the binary signals indicative of the decimal digits, include sign-indicating signals and format-defining signals. The system operates under programmed direction to generate either the sum or the difference while forming the appropriate sign of the result and while establishing the required format-defining signals. The binary coded decimal arithmetic system incorporates a binary adder and a decimal network in a binary data processing system. A programmable system of adding or subtracting coded operands which express values that cannot be stored in a single set of storage registers is also described.

INDEX

| | Column |
|---|---|
| BACKGROUND OF THE INVENTION | 1 |
| Field of the Invention | 1 |
| Description of the Prior Art | 1 |
| SUMMARY OF THE INVENTION | 1 |
| DESCRIPTION OF THE DRAWINGS | 3 |
| CONVENTIONS | 4 |
| SYSTEM OPERATION | 4 |
| The Data Processing System | 5 |
| Instruction Formats | 5 |
| Number System | 7 |
| Decimal Operands | 8 |
| Decimal Repertoire of Instructions | 9 |
| End-Off-Carry and Overflow Designators | 10 |
| Decimal Arithmetic | 11 |
| (a) Decimal addition | 12 |
| (b) Decimal subtraction | 12 |
| Multiple-precision Decimal Arithmetic | 14 |
| Sign of Zero | 15 |
| Special Case | 18 |
| DESCRIPTION OF PREFERRED EMBODIMENT | 19 |
| System Consideration | 19 |
| Decimal Network | 19 |
| CLAIMS | 27 |
| | 31 |

BACKGROUND OF THE INVENTION

Field of the invention

This invention relates to an improved data processing system, and more particularly, it relates to digital computers and similar types of machines which are useful for performing computation, data processing, and other related functions. Specifically, the invention described is that of an arithmetic system for adding or subtracting coded operands by utilizing a binary adder to form an intermediate partial result, which in turn is operated on by modification circuitry for generating an ultimate coded result. In the preferred embodiment, the digits of the operand are represented in binary coded decimal.

Description of the prior art

Many digital computers are designed to handle data words, otherwise referred to as operands, of substantial length, thereby providing the desired data handling capability and providing adequate flexibility of operation in response to the instruction commands commensurate with the design and the application of the machine. It is frequent, however, in such machines that data items to be handled only require a fraction of the total of available capacity of each memory register as defined by the word length. Therefore, it would be unduly wasteful of the available memory space to store such short items in individual addressable registers. Typical of such items are constants, alpha-numeric symbol representations, and other coded values or the like. In the preferred embodiment to be described below, the data work is defined by the capacity of a single addressable memory register and is comprised of thirty-bits. In the system in which the subject invention is to perform, a useful word segment is six-bits. These six-bit portions are referred to in the prior art and herein as "bytes." Coincidentally, a desirable mode of expressing alpha-numeric characters in a coded form requires six-bits of storage space. The latter format is referred to hereinafter as Fieldata.

Due to the particular adaptability of the binary number system to switching logic, many prior art machines are constructed in a manner to perform their arithmetic operations in the binary number system. These machines are often referred to as binary digital computers. It was recognized at an early stage, that many persons, due to their training, are used to thinking in the decimal number system and the binary number system creates certain problems of adaptability for these persons not having a particular schooling in that regard. Accordingly, it was established at an early time that the user could consider the operations to be in decimal whereas the internal operation of the computer could be made in terms of binary arithmetic. To accommodate this dual radix operation, the binary coded decimal format was developed. In the binary coded decimal format, four binary digits are utilized to represent a single decimal digit. Many systems have been developed based on this binary coded decimal manipulation system.

One of the ultimate goals in all machine constructions is to maximize the utilization of memory cells and registers since this normally is an expensive portion of any data processing system. It is of course apparent as it was in the prior art, that four binary digits can express sixteen possible binary digit combinations and is excessive for the requirements of uniquely expressing ten decimal digits. Accordingly, the prior art systems recognize various ways of accommodating arithmetic operations wherein binary coded decimal digits were used. Due to the fact that the binary coded decimals were usually in adjacent positional locations, and due to the necessity of providing correction signals for the unused signal combinations in excess of those required to uniquely express the ten decimal digits, the prior art systems usually operated in a decimal digit serial mode in providing addition or subtraction.

As general purpose data processing systems matured in the business field, it became ever increasingly important to provide a more broad spectrum of total system capability. Accordingly, it became desirable to provide a data processing system wherein binary operations could be performed, decimal operations could be performed, and alpha-numeric symbols could be internally handled in an expeditious manner. To accommodate the handling of the alpha-numeric characters, six-bits (byte) are commonly utilized for each character. The binary coded decimal signals require only four binary digits but fit within the byte framework. Of course the binary number system can be built into the system without disrupting either the Fieldata or binary coded decimal modes of operation. It should be understood that these three types of data handling formats are not generally used simultaneously, though they may all be used within a single series of data manipulations.

It is a primary objective, therefore, of this invention to provide an improved data processing system wherein the user has the option to select binary arithmetic, or binary coded decimal arithmetic operations within the framework of the system which permits the handling of alpha-numerical coded data in a Fieldata format.

To provide further system versatility, it is desirable in large scale data processing systems to provide a capability of adding or subtracting decimal numbers which are of a numerical value greater than that which can be expressed in a single set of operands. Accordingly, the apparatus of this invention includes control circuitry which can be utilized to manipulate coded decimal operands of a size exceeding that of a pair of memory registers. It is, therefore, another primary objective of this invention to provide an improved arithmetic system wherein binary coded decimal operands having a total numerical value in excess of that which can be expressed in a single set of memory registors can be added or subtracted as desired.

It is of course common in arithmetric operations to be forced to manipulate both positive and negative numbers. It is another primary objective, then, to provide an improved data processing system wherein both binary and binary coded decimal operands can be expressed as either positive or negative values and can be handled for addition or subtraction in the improved arithmetic section, which will be described below.

SUMMARY OF INVENTION

This invention comprises an improved data processing system wherein binary and decimal arithmetic can be programmed and executed. Further, the invention provides for arithmetically handling coded operands, wherein other than numerical data signals are included. The prior art suggests systems for performing arithmetic operations on binary operands, or decimal operands, or binary coded operands, or operands wherein a set of variable radix conditions can be handled. In this regard it is desirable to provide a system wherein two or more of these types of operands can be operated on arithmetically. The Arithmetic Section of this invention can accommodate binary and binary coded decimal operands, and utilizes the binary adder alternatively for operating on a pair of binary operands or a pair of binary coded decimal operands which have a plurality of decimal digits represented therein. The coded decimal digits are in predetermined positional locations and include non-numerical signal portions for defining format and sign, where "non-numerical" is used to differentiate between signals which represent the format and sign, as opposed to "numerical" for designating the decimal digits. These non-numeric portions are intermediate adjacent coded decimal digits. The binary adder operates on the coded decimal digit portions of the operands in parallel so that an intermediate result is generated at a high computational rate. The system then operates to evaluate the partial resultant to add in factors which account for the unused binary digit combinations that result between those required to express decimal digits uniquely and the 16 possible combinations available from the four-bits provided for expressing each decimal digit. These factors, in combination with the required decimal carries or borrows, result in the correct sum or difference value being formed. Having determined the correct sum or difference, the non-numerical format defining signals are inserted therein. Additionally, this invention provides for performing so-called multiple-precision arithmetic operations on binary coded operands. For purposes of this discussion "multiple-precision" will refer to addition or subtraction of a pair of operands which cannot be stored in a single set of memory registers. This mode of operation requires more than one pass through the Arithmetic Section. Further, it requires circuitry for "remembering" carry or borrow information between segments that are to be manipulated in subsequent passes.

DESCRIPTION OF DRAWINGS

FIGURE 1 is a simplified block diagram which illustrates the operational relationship of the primary elements of the data processing system which incorporates this invention; FIGURE 2 illustrates the format of the basic instruction; FIGURE 3 illustrates the format of the special condition instruction for decimal instructions; FIGURE 4a through FIGURE 4f illustrate the logic circuit symbolic representation and functions for the embodiment described; FIGURE 5 illustrates the format of the decimal operands.

CONVENTIONS

Figure 6:
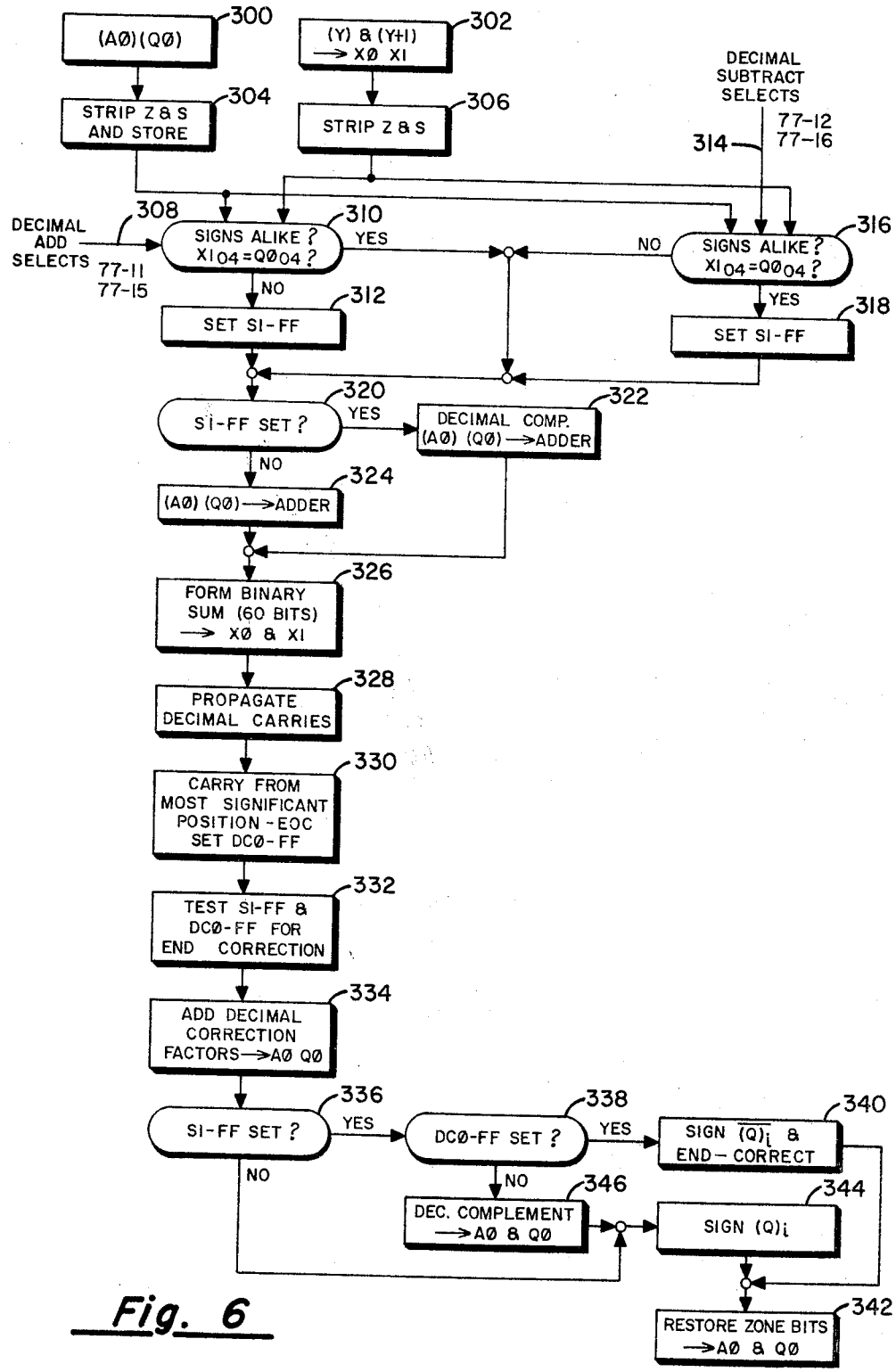
FIGURE 6 is a logic flow diagram which defines the sequence of steps for a Decimal Add and a Decimal Subtract operation.

The following circuitry discussion of the improved arithmetic system will be in terms of block and logic diagrams since the detail operation of the various elements are well-known. Various registers will be referred to. These registers can be considered to be comprised of a plurality of bistable flip-flop circuits of a type readily available in the commercial marketplace. It will be understood that each flip-flop is capable of being set to one of two possible stable static conditions. It will further be understood that both the true and the complement value of the existing static state are available as output signals. For example, if a voltage level indicative of a true value of a digit is applied and set into the flip-flop, the voltage level indicative of the true value will be available at the Set (S) output terminal, and a voltage indicative of the Complement value will be available at the Clear (C) output terminal. Alternatively, if the flip-flop is cleared, a voltage indicative of the cleared state will be available at the C output terminal and the complement voltage value will be available at the T output terminal. Each register for this embodiment is comprised of 30 stages designated as $2^0$ for the least significant to $2^{29}$ for the most significant digit positions. Stage $2^{29}$ is the binary operand sign indicating stage and $2^4$ is decimal operand sign indicating stage. A logical 1 signal represents a negative binary operand and a logical 0 signal represents a positive binary operand. The reverse sign values are used for decimal operands. Note the distinction between the sign of a binary operand and a binary coded decimal operand.

This embodiment makes use of logical connective circuits of types well-known in the art. The logical AND circuit is denoted by a block with the letter A at the center thereof and represents a logical connective wherein both input terminals must receive like active signals in order for a similar active signal to be available at its output terminal. The logical OR circuit is designated with OR in the center of a block and operates to provide an active signal at its output terminal when any or all of its input terminals receive an active signal. An Inverter circuit is illustrated as a block with an N at the center thereof and operates in a manner well-known to invert the level of the signal applied to its input terminal. Other logic elements are described and defined in FIGURE 4a through FIGURE 4f along with the truth-tables for defining the respective logical operations. These circuits are well-known and are commercially available, or can be constructed from commercially available components. The circuit operation is obvious to one skilled in the art, and accordingly, a detailed description of the respective operations will not be made, since this would not appear to add to an understanding of the invention. Each of the circuits illustrated performs the logical connective function shown within the symbol. It is understood that each of the elements illustrated in FIGURES 4a through 4f include an inverting signal amplifying circuit at the output. This is reflected in the truth-tables. FIGURE 4a is a high-fanout-driver (HFD) OR-Inverter circuit wherein the output circuit is an inverting amplifier capable of driving up to 60 logic circuit input terminals. When only a single input is used, it becomes an inverter amplifier. In the truth-tables a "—" illustrates a don't-care condition and can be any combination of 1's and 0's. The legend defines the half-arrow and bare-line line terminations utilized in describing the logic arrangements. It is, of course, understood that other types of logic configurations could be utilized in implementing the present invention; however, those shown herein have been found to be advantageous both with regard to cost and operational rates.

In addition to the line connections used in the logic diagrams, the line connections between the various elements are of two basic types. A set of parallel lines terminated by an arrowhead indicates parallel conductive paths for carrying a plurality of data signals. In block diagrams, a single line terminated by a full arrowhead normally indicates a conductive path for carrying control signals. It should be recognized of course that there is no particular distinction between what is termed a "control signal" or a "data signal" other than it is convenient for purposes of discussion to distinguish therebetween. Further, data signals can be utilized for performing control functions. The interconnection lines are terminated by full arrowheads, and they denote the direction of signal flow and can be considered to be points of circuit interconnection.

For purposes of this discussion, the terms "logical 1" and "logical 0" or simply "1" or "0" will be utilized to designate the appropriate signal level which is indicative of the binary 1 or 0 value. For example, when considering a two input AND, and 1's are considered to be active and available on both inputs, a 1 will be available at its output signal. This numerical designation of these signals is felt to be advantageous in that the precise signal levels will vary depending upon the circuitry chosen for the implementation.

In referring to an address in the addressable memory, the letter "Y" is utilized. To represent the operand stored at address "Y," the designation is (Y), with the parenthesis indicating the operand. The designation $(\overline{Y})$ is utilized to represent the 1's complement of the operand stored at address "Y." Binary coded decimal operands, and the 9's and 10's complement thereof will be described below.

SYSTEM OPERATION

The Data Processing System

FIGURE 1 is a simplified block diagram which illustrates the operational relationship of the primary elements of this invention within the environment of a data processing system. The invention will be described in the environment of an operational data processing calculator, but will not describe the input/output operations normally included in such a calculator. It is usual for such data processing calculators to have an established repertoire of instructions. The repertoire of instructions normally defines the operations which the calculator can perform, such as add, subtract, multiply, store, divide, and the like. In a stored program calculator the list of instructions (program) which are to be performed are normally stored in the Memory Section shown enclosed in dashed block 10, from whence they are individually read out for execution.

The order of reading out the instructions can be controlled by an Instruction Address Counter (not shown) for selecting sequential instructions, or can be of the type where each instruction designates the address of the next instruction to be executed, or a mixture of each. The mode of control is mentioned generally and will not be described in greater detail since it does not form a part of the invention. In the course of operation, the instructions are normally read into the Control Section, shown enclosed in dashed block 12, and stored in an Instruction Register 14. The instructions normally are comprised of an operation code, that is, the part which defines the function to be performed by the calculator. The instructions also include an address portion for addressing the Memory Section or selecting operands either to be read out therefrom or stored therein. Additional designators are commonly employed to provide address modification by way of indexing or so called B-boxing, for providing for indirect addressing, and for determining whether or not a full length Memory Register or some portion thereof is to be utilized. The instruction word format and the various functions will be described in more detail below. When the instruction resides in the Instruction Register, the operation porton is normally translated by a Function Code Translator and Operand Addressing circuitry 18 for selecting a particular set of control sequence circuits which will provide control signals for guiding the execution of the particular operation to be performed and for addressing the Memory Section. Data processing machines can be of the single-address type, that is, wherein only one memory register of the Memory Section can be addressed and be given instructions; double-address machines wherein each instruction can designate two addresses in the main memory; or three-address machines. The binary coded decimal arithmetic operations which will be described and comprise this invention, will be described within the framework of a single-address machine. It is common in the execution of a program for a resultant operand to be stored both in the Memory Section 10 of the computer and to be retained in the Arithmetic Section, shown enclosed in dashed block 20, for manipulation by subsequent instructions. This is especially common in single-address machines wherein only one operand can be called for in a given instruction. For instance, in a binary coded decimal addition operation, where two operands must be specified, that is, the addend and the augend, it is necessary in a single-address machine to first have one of the operands residing in the Arithmetic Section. Subsequently, when the addition operation is called for, the address portion of the instruction designates the second operand which is to be utilized in the binary coded decimal addition operation.

The elements illustrated in FIGURE 1 are considered only generally at this time and will be given a more detailed treatment below. In FIGURE 1, the Memory Section 10 is comprised of storage registers in which the stored programs and recorded data reside, referred to collectively as Addressable Memory 22. The Memory Section can be comprised of magnetic core storage registers, plated wire memory registers, bistable flip-flop registers, thin film registers, magnetic drum or disk records or any of the other well-known types of Addressable Memory apparatus. The Memory Section 10 also includes the Read/Write circuits 24, including amplifiers and address selection circuitry required for recording in a designated storage register and reading out of a designated storage register along paths 26 and 28 respectively, but for purposes of this discussion are not shown in detail. A detailed operation of the Memory Section 10 need not be considered further, it being understood that Memory Sections are available in the prior art, and the detailed operation of which do not form a part of this invention.

The Control Section 12 is utilized to provide control for the rest of the data processing system. The Control Section interprets and directs the execution of the computer instructions and auxiliary operations. Each computer instruction, except input-output instructions, performs one or more basic operations such as referred to above. Each instruction can also specify certain special auxiliary operations that may modify or extend the basic operation. The Control Section 12 includes Timing and Sequence Control circuitry 30 for timing the execution of each instruction and for accessing the Memory Section. Commonly, an oscillator is used as a primary source of regularly occurring signals. These signals are used to drive timing chains, that is, groups of circuits which provide control pulses at predetermined times and guide the respective data processing operations. The Control Section 12 operates to sequentially read the instruction from the Memory Section 10 into an Instruction Register 14. The Instruction Register stores the instruction being executed at any given time.

The Arithmetic Section 20 functions to perform the arithmetic and data manipulating operations. The data input to the Arithmetic Section 20 is along cable 32 into an Operand Selector 34. The form of the operand is controlled in part by the Function Code Translation and Operand Addressing circuitry 18 by way of control line 36 and in part by the Timing and Sequence Control 30 by way of control line 38. Having selected the form of the operand, which will be described in more detail below, the operand will be transmitted along cable 40 to the Binary Arithmetic System 42. Control line 44 determines the nature of the arithmetic operation to be performed and control line 46 supplies the sequential timing for executing the operation. When a decimal operation is requested, a Decimal Logic Network 48 is in communication with the Binary Arithmetic System through interconnecting lines illustrated graphically as cables 50 and 52. The control of the Decimal Logic Network 48 is accomplished according to the specific decimal operation to be performed by control line 54, and is timed by signals received on control line 56. Decimal addition and decimal subtraction utilizes the Binary Arithmetic System 42 in conjunction with the Decimal Logic Network 48. It is the interrelationship of these elements in the Arithmetic Section 20 which comprises the essential elements of this invention. A functional and more detailed description of the interrelationship of these elements will be set forth below.

Instruction Word Formats

Each instruction performed by the computer is designated by a 30-bit instruction word for the embodiment described; and is performed in two sequential steps, namely, interpretation and execution. When the instruction word is interpreted, the instruction word is analyzed to activate logic circuits, which will perform a specific operation, as mentioned above in a consideration of the Control Section. When the instruction is executed, the actual function designated is performed. The following listing describes the principal events which occur when an instruction is interpreted and then executed:

(a) Interpretation is performed in four basic steps:
  Acquire the instruction word from Memory;
  Determine the operand source;
  Determine the operation to performed; and
  Condition the control logic circuits.
(b) Execution is performed in three basic steps:
  Obtain the operand from Memory when required;
  Perform Arithmetic or logic operation; and
  Store the results in Memory when required.

FIGURE 2 illustrates the basic instruction word format and comprises five basic parts which are designated as:

*f*—the function code designator consists of six-bits which, when decoded, specify the major operation to be performed;

*j*—the branch condition designator consisting of three-bits which, when decoded, specify skip or jump conditions, registers, or repeat modifications;

*k*—operand interpretation designator consisting of three-bits which, when decoded, defines the source and form of the operand. The interpretation of *k* is different for the read, store and replace categories of instructions;

*b*—index designator consisting of three-bits which, when decoded, specifies the selected B-Register (Indexing Registers) to be used in conjunction with the modification of the address portion *y*; and

*y*—operand, or operand address designator, which consists of 15-bits.

Depending on *k*, *y* may represent an operand as it exists, or an operand address. When *y* designates the address of an operand, the contents of the designated B Register as determined by the *b* designator is added to the *y* portion of the instruction to form an absolute address Y.

FIGURE 3 illustrates the special condition instruction word format for decimal instructions and comprises four basic parts:

*f*—the function code designator is set to a special code of 77 for decimal instructions, and causes the designator portions to be interpreted in a special manner;

*sf*—the subfunction designator consists of 6-bits, 18 through 23, and are interpreted as subfunctions of the basic decimal operation. The various subfunctions defines the operations and will be listed and described below.

*b*—index designator which specifies the selected B-Register as described above; and

*y*—operand, or operand address designator consists of 15-bits which, when combined with the selected contents of the B-Register, specifies address Y which is the most significant half of the selected decimal operand.

A special instruction format is provided for input/output instructions, but will not be discussed since it does not provide a part of the subject invention.

Number System

In the binary coded decimal (BCD) number format, four binary digits (bits) are utilized to express each decimal digit. Table I illustrates the binary equivalent of the decimal digits 0 through 9.

TABLE I $0 = 0000_2$
$1 = 0001_2$
$2 = 0010_2$
$3 = 0011_2$
$4 = 0100_2$
$5 = 0101_2$
$6 = 0110_2$
$7 = 0111_2$
$8 = 1000_2$
$9 = 1001_2$

In the embodiment of the subject invention, logic circuitry is not incorporated for detecting illegal characters that may be presented to the Arithmetic Section. The illegal characters would be the remainder of the sixteen signal combinations that can be expressed in four binary digits. These illegal codes would be $1010_2$ through $1111_2$. For this embodiment, the presentation to the Arithmetic Section of binary coded signal combinations designated as being illegal may result in an incorrect arithmetic result.

During the execution of decimal operation, two types of complement values are required. These types of complement values are the 10's complement and the 9's complement. For purposes of the discussion of this invention, the 10's complement will be defined as the numerical value generated by taking the 9's complement of each digit in the binary coded decimal operand with the exception of the least significant digit, and the 10's complement of the least significant digit. The 9's complement of an operand is defined as the numerical value generated by taking the 9's complement of each digit including the least significant digit of the original operand. Table II illustrates the correspondence between an originally presented operand and each of the just defined complementary forms.

TABLE II

| D | 9's | 10's | D | 9's | 10's |
|---|-----|------|---|-----|------|
| 0 | 9 | *10 or 0 | 5 | 4 | 5 |
| 1 | 8 | 9 | 6 | 3 | 4 |
| 2 | 7 | 8 | 7 | 2 | 3 |
| 3 | 6 | 7 | 8 | 1 | 2 |
| 4 | 5 | 6 | 9 | 0 | 1 |

*For internal operations, the 10's complement of zero must be generated as 10 ($1010_2$); however, in the final result the 10's complement is generated as zero. This generation of the 10's complement of zero causes a special condition which will be described in more detail below.

By way of example, the following binary coded decimal operand is illustrated with each of the types of complementary designations described above:

EXAMPLE 8 4 3 7 1 9 0 5 2 6 (Original Operand)
1 5 6 2 8 0 9 4 7 3 (9's Complement)
1 5 6 2 8 0 9 4 7 4 (10's Complement)

Utilization of each of the foregoing complementary forms will be discussed in conjunction with the implementation of this invention and their relevance defined more fully below. It will of course be apparent that for the example illustrated above, the binary representation can be derived by substituting the four binary coded digit representations illustrated in Table I into the digit positions for the example.

Arithmetically, the 9's complement of a given digit can be calculated by subtracting the digit from 9. Similarly, the 10's complement of a digit can be formed by substracting a digit representation from 10. As an alternative to the subtraction process, the bit configuration of the binary coded decimal digit arrangement can be evaluated and a system constructed wherein the binary coded decimal representation for the 9's or 10's complement can be generated directly without requiring the execution of the subtract operation. It is the latter system that is utilized in the embodiment of this invention and will be discussed in more detail below.

Decimal Operands

All decimal operations within the embodiment of this invention are performed on signed 10-digit operands contained in two 30-bit computer words. Decimal operands having a range of values from −9,999,999,999 through +9,999,999,999 are permissible. FIGURE 5 illustrates the format of the pair of 30-bit computer words which represent a binary coded decimal operand. Operands that are stored in the Arithmetic Section are stored with the most significant half of the operand in the 30-bit $A\phi$ Register and the least significant half of the operand stored in the $Q\phi$ Register. Decimal operands that are stored in the Memory Section 10 are stored in the manner such that the most significant half is stored at Memory Address Y and the least significant half is stored at Memory Address Y+1. The binary coded decimal operands are arranged in positional notation, with the position in the Register being indicative of the value of the respective digits. Digit positions 0, 1, 2, 3 and 4 are retained in the least significant half Storage Register (Y+1) and digits 5, 6, 7, 8 and 9 are retained in the most significant half Storage Register (Y).

The format defining bit positions are referred to as Zone bits and are designated as Z. The Zone bits are intermediate the binary coded decimal digits, and are a function of the type of coding system designated in the operand. It will be recalled from above, that this system utilizes Fieldata, which is designated by a Z value of $11_2$; and a straight binary coded decimal coding system wherein the Z value is indicated as $00_2$. In performing the arithmetic operations, the Zone bits of the operand stored in the Memory at addresses Y and Y+1 are removed and ignored during the arithmetic operation. The Zone bits of the operand stored in the $A\phi$ Register and the $Q\phi$ Register are removed and saved prior to the initiation of the arithmetic operation. The Zone bits to be utilized in the result are the same as the originally saved Zone bits.

Each decimal operand provides a magnitude of a 10-digit number plus a sign indicating signal. A single bit position is utilized for designating the sign, and for the embodiment illustrated, bit position $2^4$ in the least significant half is utilized. The sign bit (S) is interpreted such that a signal indicative of a "1" is utilized to indicate a positive operand and a signal indicative of a "0" is utilized to define a negative operand. It will be noted that this is just the reverse of the sign indication for the usual binary arithmetic. During the decimal arithmetic operation the sign of the operand in $A\phi\ Q\phi$ is extracted and stored, as is the sign of the operane read from the Memory Section registers Y and Y+1. The values of the respective signs of the operands is utilized in determining the ultimate sign of the result. This will be described in more detail below.

Instruction Repertoire

The following decimal instructions are included in the repertoire of the illustrative embodiment of the invention:

f sf
77-10 Decimal Test
-11 Decimal Add
-12 Decimal Subtract
-13 Decimal Compare Greater
-14 Decimal Complement
-15 Decimal Add With Carry
-16 Decimal Subtract With Borrow
-17 Decimal Compare Less Only the Add and Subtract sequences will be described in detail.

77-10 DECIMAL TEST: The least-significant eleven bits of the instruction word ($2^{10}$ through $2^0$ of the y field) plus the contents of the specified index register define a skip condition. Skip determination is made on the decimal contents of AQ and the presence or absence of an overflow condition. Executing this instruction does not modify the contents of $A\phi\ Q\phi$. The skip conditions are as follows:

| Y | Skip Condition |
|---|---|
| $2^0$ | Skip if Overflow Designator is Set. |
| $2^1$ | Skip if Overflow Designator is Not Set. |
| $2^2$ | Skip if $(A\phi)\ (Q\phi)$ (Decimal) is Positive $(Q_4=1)$. |
| $2^3$ | Skip if $(A\phi)\ (Q\phi)$ (Decimal) $=\pm 0$ (Sign and Zone bits are ignored). |
| $2^4$ | Skip if $(A\phi)\ (Q\phi)$ (Decimal) is Negative $(Q\phi_{04}=0)$. |
| $2^5$ | Skip if $D_5$ $(A\phi_{3-1})\pm 0$. |
| $2^6$ | Skip if $D_6$ $(A\phi_{9-6})\pm 0$. |
| $2^7$ | Skip if $D_7$ $(A\phi_{15-12})\pm 0$. |
| $2^8$ | Skip if $D_8$ $(A\phi_{21-18})\pm 0$. |
| $2^9$ | Skip if $D_9$ $(A\phi_{27-24})\pm 0$. |
| $2^{10}$ | Skip if $(A\phi)\ (Q\phi)$ (Decimal) $\pm 0$ (Sign and Zone bits are ignored). |

When more than one skip condition is specified, the skip is made when any one or more of the specified skip conditions are satisfied.

77-11 DECIMAL ADD: The decimal contents of Y, Y+1 are added to the decimal contents of $A\phi\ Q\phi$. The result is stored in $A\phi\ Q\phi$ along with the Zone bits of the original $A\phi\ Q\phi$ operand. During the execution of this instruction, the states of the End-Off-Carry and/or the OVERFLOW designators may be changed. When it is necessary to complement one operand (Aφ) (Qφ) or the result, the ten's complement is generated. A longer execution time is required when it is necessary to complement the result.

77-12 DECIMAL SUBTRACT: The decimal contents of Y, Y+1 are subtracted from the decimal contents of Aφ Qφ. The decimal subtract operation is identical to the decimal add operation except for the conditions that determine when it is necessary to complement one of the original operands (Aφ) (Qφ).

77-13 DECIMAL COMPARE EQUAL: The decimal contents of Y, Y+1 are compared with the decimal contents of (Aφ) (Qφ) and when they are equal, the next sequential program step is skipped. The contents of Aφ, Qφ, Y, and Y+1 remain unchanged.

77-14 DECIMAL COMPLEMENT: The decimal complement of the contents of Aφ Qφ is generated and loaded into Aφ Qφ with the Zone bits of Aφ Qφ unchanged. The least-significant bit position of the instruction ($2^0$ of the y field) plus the contents of the specified index register determine whether the nine's or ten's complement is generated. When this bit is a one, the nine's complement is generated and when it is a zero, the ten's complement is generated.

77-15 DECIMAL ADD WITH CARRY: The decimal contents of Y, Y+1 are added to the decimal contents of Aφ Qφ. The decimal add with carry operation is identical to the decimal add operation except the End-Off-Carry designator is introduced into the correction factor as a carry into the least-significant digit position and when it is necessary to complement the result and/or one of the operands (Aφ) (Qφ), the nine's complement is generated. Note that the state of the End-Off-Carry designator cannot be changed until after the correction factor is generated.

77-16 DECIMAL SUBTRACT WITH BORROW: The decimal contents of Y, Y+1 are subtracted from the decimal contents of Aφ Qφ. The decimal subtract with borrow is identical to the decimal add with carry except for the conditions that determine when it is necessary to complement one of the original operands (Aφ) (Qφ).

77-17 DECIMAL COMPARE LESS: The decimal contents of Y, Y+1 are compared with the decimal contents of Aφ Qφ and when the Y, Y+1 operand is greater than the Aφ Qφ operand, the next sequential program step is skipped. The contents of Aφ, Qφ, Y, and Y+1 remain unchanged.

End-Off-Carry And Overflow Designators

The Internal Function Register (IFR) is utilized to provide an orderly return to a program which has been momentarily disrupted to honor an interrupt, and to store special designator conditions. Those designators which are relevant to the handling of decimal operands will be described in detail in conjunction with FIGURE 7. As illustrated, two designators are utilized during the execution of decimal instructions. Bit position $2^{23}$ of IFR is designated $f4$ or DCφ F/F, and is used to indicate the state of a decimal carry referred to as End-Off-Carry (EDC). The conditions under which the End-Off-Carry is set will be described in detail in the consideration of the operation of the decimal add and the decimal subtract. Bit position $2^{24}$ of IFR is designated the $f5$ designator, or DEC OVFL F/F, and is used to indicate an external decimal overflow. Each time a decimal add or decimal subtract, with or without carry or borrow, is performed, the End-Off-Carry and overflow conditions within the Arithmetic Section are checked and the corresponding designator in IFR is set or cleared. The only times when the states of these two designators can be altered is when decimal add or subtract instructions are executed, or when the IFR is initially loaded. Other functions of IFR are not relevant to this invention and will not be described.

Decimal Arithmetic

Decimal arithmetic is performed in the described embodiment by utilizing the available, 60-bit, 1's complement, subtractive binary adder and a special decimal logic network which generates decimal complements and correction factor constants used to correct the binary sums generated. The two basic decimal arithmetic operations (addition and subtraction) are described in the following paragraphs.

Decimal Addition

Decimal addition is performed on two ten-digit operands, one in Aφ, Qφ and the other (Y, Y+1) in memory. The Zone bits and Sign of Aφ, Qφ are stored in auxiliary registers and the Zone bits of Y, Y+1 are stripped as the operand is transferred into the Arithmetic Section. Since the operands contain the magnitude of a ten-digit number plus a Sign bit, the sequence of operations varies slightly depending on whether the two operands have like or unlike signs.

Operands having like signs may be added without modifications. After the Zone and Sign bits of (Aφ) (Qφ) have been stored, they are stripped from the original operand, which is added to (Y), (Y+1) (less Zone and Sign bits). This is a binary add operation. Since the Zone bits have been stripped, and added as zeros, the addition is performed on ten pairs of four-bit numbers with no possibility of a carry propagating from one character to another. The term "carry" is used here only as an analogy. Since the main adder is a subtractive adder, borrows are propagated between characters; however, the adder output is the same as would be generated by an additive adder.

Since the original digits range only from zero through nine ($11_8$) the binary coded sum digits, also referred to as partial resultant, may range from zero through 18 ($22_8$). Each character in the partial resultant is used to generate correction factor constants which, when added to the partial resultant, will generate the correct sum in the proper coded decimal format. The correction factor generator also handles all decimal carries between digits. Correction factors are required when a sum digit exceeds the maximum allowable decimal digit (nine). When this condition is detected, a carry to the next digit is generated and a constant is generated which, when added to the original binary coded sum-digit, causes the final sum to "skip over" the intermediate illegal values ($12_8$ through $17_8$). Carries and corrector factor constants are generated as illustrated in Table III.

TABLE III

| When the First Sum-Digit is— | The Following Correction Factor is Generated if, From The Preceding Digit, There is— | |
|---|---|---|
| | No Carry | A Carry |
| Less than 9 | 0 | 1 |
| Equal to 9 | 0 | *7 |
| Greater than 9 | 6 | *7 |

*A carry is generated to the following digit position when the sum digit exceeds nine and when the sum digit equals nine and a carry is generated by the preceding digit.

When a carry is generated by the most-significant position (End-Off-Carry), it is indicated (see Decimal Test instruction) as a decimal overflow condition since the sum exceeds ten decimal digits. Any overflow into the Zone and Sign bit positions during the second add operation is discarded and the resulting sum is recombined with the original Zone bits of $A\phi\ Q\phi$.

Example I illustrates Decimal Addition with like signs. The original operands are in proper Fieldata format and are shown in octal notation. The binary system is also shown and the result is shown in decimal as well as Fieldata format.

EXAMPLE I.—DECIMAL ADDITION WITH LIKE SIGNS FORM $$(Y)(Y+1) = 1786294371\ (-)$$
$$+(A\phi)(Q\phi) = 6018497780\ (-)$$
$$\overline{7804792151\ (-)}$$

A. In Octal:
- (1a) (Y)(Y+1) = 6167706662 7164636701 (—)
- (2a) (A$\phi$)(Q$\phi$) = 6660617064 7167677000 (—)
  Strip and store Zone bits and Sign of (A$\phi$)(Q$\phi$) =
- (3a) 6060606060606060606000
  The (Y), (Y+1) and (A$\phi$)(Q$\phi$) operands with Zone bits and Sign stripped=
- (4a)   0107100602  1104030701 Stripped (Y)(Y+1)
- (5a) +0600011004  1107071000 Stripped (A$\phi$)(Q$\phi$)
- (6a)   0707111606  2213121701 Partial Sum
  The correction factor constants are generated and added to the partial sum.
- (7a) 0707111606  2213121701 Partial Sum
- (8a) 0001070601  0707070600 Correction
- (9a) 0710202407  3122212501 Second Sum
  Combine Zone bits and Sign stripped from (A$\phi$)(Q$\phi$) with Sum.
- (10a) 0710000407  1102010501 Stripped Second Sum
- (11a) 6060606060  6060606000 Zone and Sign
- (12a) 6770606467  7162616501 Result (—)

B. Expressing the foregoing in Binary:
- (1b) $\begin{cases} (Y) = 11/0001/11/0111/11/1000/11/0110/11/0010 \\ \quad\quad D9\ \ D8\ \ D7\ \ D6\ \ D5 \\ (Y+1) = 11/1001/11/0100/11/0011/11/0111/0000/01 \\ \quad\quad D4\ \ D3\ \ D2\ \ D1\ \ D0 \end{cases}$
- (2b) $\begin{cases} (A\phi) = 11/0110/11/0000/11/0001/11/1000/11/0100 \\ \quad\quad D9\ \ D8\ \ D7\ \ D6\ \ D5 \\ (Q\phi) = 11/1001/11/0111/11/0111/11/1000/00/0000 \\ \quad\quad D4\ \ D3\ \ D2\ \ D1\ \ D0 \end{cases}$
  Stripped Zone bits and Sign of (A$\phi$)(Q$\phi$)=
- (3b) 11000011000011000011000011000011000 110000110000110000110000110000000000
  Operands with Zone bits and Sign Stripped.
- (4b) $\begin{cases} (Y) = 00/0001/00/0111/00/1000/00/0110/00/0010 \\ \quad\quad 1\ \ \ \ 7\ \ \ \ 8\ \ \ \ 6\ \ \ \ 2 \\ (Y+1) = 00/1001/00/0100/00/0011/00/0111\ 00/0001 \end{cases}$
- (5b) $\begin{cases} (A\phi) = 00/0110/00/0000/00/0001/00/1000/00/0100 \\ \quad\quad 6\ \ \ \ 0\ \ \ \ 1\ \ \ \ 8\ \ \ \ 4 \\ (Q\phi) = 00/1001/00/0111/00/0111/00/1000/00/0000 \\ \quad\quad 9\ \ \ \ 7\ \ \ \ 7\ \ \ \ 8\ \ \ \ 0 \end{cases}$
  The Partial Sum of Lines (4b)+(5b) =
- (6b) $\begin{cases} 00/0111/00/0111/00/1001/00/1110/00/0110 \\ 01/0010/00/1011/00/1010/00/1111/00/0001 \end{cases}$
  The Correction Factor=
- (8b) 00000000001000111000110000000001110001110001110001110000000
  The Second Sum is line (6b)+(8b) =
- (9b) $\begin{cases} 00/0111/00/1000/010/000/01/0100/00/0111 \\ 01/1001/01/0010\ 01/0001/01/0101/00/0001 \end{cases}$
  The Stripped Second Sum=
- (10b) 000111001000000000000100000111 001010000100000010001000101000001
  The Result is Combined with Stripped Second Sum and the Original
  Zone bits and Sign of (A$\phi$)(Q$\phi$)=lines (3b)+(10b) =
- (12b) 11011111100011000011010011011111110011100101100011101010010001

C. The Binary Coded Decimal Corrected Result Less Zone Bits and Sign is=
  00/0111/00/1000/00/0000/00/0100/00/0111
      7       8       0       4       7
  00/1001/00/0010/00/0001/00/0101/00/0001 (—)
      9       2       1       5       1

Addition of two decimal numbers having unlike signs may be accomplished by adding the number with the greatest magnitude to the ten's complement of the other. To save the time required for a magnitude compare operation, the System arbitrarily complements the operand in $A\phi Q\phi$ whenever unlike signs are detected. The addition operation then proceeds in the same manner as addition with like signs.

When the operand having the smallest magnitude is complemented, the number generated will exceed the uncomplemented operand by an amount sufficient to cause an End-Off-Carry to be generated. When the operand having the greatest magnitude is complemented, no End-Off-Carry is generated and the resulting decimal sum (second sum) is the decimal complement of the desired result. In this case, the ten's complement of the sum is generated and the result is assigned the Sign of the $A\phi Q\phi$ operand. When an End-Off-Carry is generated, the sum is correct and is assigned the opposite Sign as that of the original $A\phi O\phi$ operand. Note that External overflow cannot occur (and will never be indicated) when operands having unlike signs are added; however, the End-Off-Carry is retained to facilitate the programmed, multiple-precision decimal arithmetic, that is, operations performed on operand fields greater than ten digits in length, as is described in succeeding paragraphs.

Example II illustrates Decimal Addition with operands having unlike signs. Operand magnitudes are the same as those used in the preceding example, only the sign of (A$\phi$)(Q$\phi$) has been changed to positive. Note that if the roles of the two operands used in the Example II were reversed, the operand with the smallest magnitude would be complemented, an End-Off-Carry generated, and the second sum would be the desired result. In this case, the generated End-Off-Carry does not indicate External Overflow, but is retained for future use under program control. Only the Octal representation is illustrated since it is felt that Example I clearly sets forth the relationship between zone bits, Sign bit and the Binary representation.

EXAMPLE II.—DECIMAL ADDITION WITH UNLIKE SIGNS $$1786294371\ (-)$$
$$+6018497780\ (+)$$
$$\overline{4232203409}$$

- (1a) (Y)(Y+1)    6167706662 7164636701 (—)
- (2a) +(A$\phi$)(Q$\phi$)  6660617064 7167677060 (+)
  The Zone and Sign bits of (A$\phi$)(Q$\phi$) are stored as:
- (3a) 6060606060 6060606060
  The Zone and Sign bits of both operands are stripped and the 10's complement of (A$\phi$)(Q$\phi$), represented as (A$\phi$)(Q$\phi$)$_D$, is generated and added to the Y, Y+1 operand.
- (4a) (Y), (Y+1):   0107100602  1104030701
- (5a) (A$\phi$)(Q$\phi$)$_{D'}$:  0311100105  0002020112
- (6a) Partial Sum:  0420200707  1106051013
  The correction factor constants are generated from, and added to the Partial sum.
- (7a) Partial Sum:  0420200707  1106051013
- (8a) Cor. Fact.:   0107060000  0000000106
- (9a) Second Sum:   0527260707  1106051121
                     (No EOC)
  The overflow into the Zone and Sign bit positions is stripped, the 10's complement is generated (since there was no End-Off-Carry), the original Zone bits of $A\phi Q\phi$ are restored to their original positions, and, since the operand with the greatest magnitude was complemented, the result is assigned the original sign of $A\phi\ Q\phi$.
- (10a) Stripped Sum:      0507060707  1106051101
- (11a) Stripped Sum':     0402030202  0003040011
- (12a) Zone and sign Bits: 6060606060  6060606060
- (13a) Result: (Octal)    6462636262  6063646071 (—)
- (13b) (Binary)=
  11/0100/11/0010/11/0011/11/0010/11/0010/11/0000/11/0011/11/0100/11/0000/11/1001
- (13c) (Decimal) =
    4    2    3    2    2    0    3    4    0    9

Decimal subtraction

Decimal Subtraction is identical to Decimal Addition except the conditions for determining that one of the operands must be complemented (before adding) are reversed. When the operands have unlike signs, they are added directly and an End-Off-Carry indicates an Overflow condition. The sign of the result is always the same as the sign of the $A\phi \ Q\phi$ operand. When the operands have like signs, the $A\phi \ Q\phi$ operand is complemented before the addition which is performed in the same manner as addition with unlike signs. External Overflow can never occur when subtraction is performed with both operands having the same sign. Examples III and IV illustrate decimal subtraction with operands having both like signs and unlike signs.

EXAMPLE III.—DECIMAL SUBTRACTION WITH UNLIKE SIGNS

| | | |
|---|---|---|
| $(A\phi)(Q\phi)$ | 6167706662 | 7164636701 (−) |
| −(Y), (Y+1) | 6660617064 | 7167677060 (+) |
| $(A\phi)(Q\phi)$ Stripped | 0107100602 | 1104030701 |
| −(Y)(Y+1) Stripped | 0600011004 | 1107071000 |
| First Sum | 0707111606 | 2213121701 |
| Cor. Fact | 000107060 | 0707070600 |
| Second Sum | 0710202407 | 3122212501 |
| Stripped Sum | 0710000407 | 1102010501 |
| Zone and Sign Bits | 6060606060 | 6060606000 |
| Result | 6770606467 | 7162616501 |

EXAMPLE IV.—DECIMAL SUBTRACTION WITH LIKE SIGNS

| | | |
|---|---|---|
| $(A\phi)(Q\phi)$ | 6167706662 | 7164636761 (+) |
| −(Y)(Y+1) | 6660617064 | 7167677060 (+) |
| $(A\phi)(Q\phi)$D′ (Stripped): | 1002010307 | 0005060211 |
| | 0600011004 | 1107071000 |
| First Sum | 1602121313 | 1114151211 |
| Dec. Cor. | 0601070707 | 0707070600 |
| | | (E-O-C) |
| Second Sum | 2403212222 | 2023242011 |
| Second Sum Stripped | 0403010202 | 0003040011 |
| Zone and Sign Bit | 6060606060 | 6060606040 |
| Result | 6463616262 | 6063646051 (−) |

NOTE.—In Example IV, the sign of the result is different than the sign of the original operands because (Y)(Y+1) > $(A\phi)(Q\phi)$; however, Zone bit $2^5$ remains unchanged.

Multi-precision Decimal Arithmetic

The Decimal Add With Carry and Decimal Subtract With Borrow instructions are provided to simplify the programming of decimal operations requiring operands greater than ten-digits in length. These two instructions differ from the Decimal Add and Decimal Subtract instructions in the following two ways:

(a) Whenever it is necessary to complement an operand (or result) the 9's complement is generated.

(b) The End-Off-Carry from the previous Decimal Add or Subtract (normal or with carry/borrow) is introduced into the decimal correction factor as a carry into the least-significant digit position.

Note here that the End-Off-Carry condition is not always the same as the External Overflow condition. When Decimal Addition is performed with like signs or subtraction with unlike signs, the End-Off-Carry does indicate External Overflow. When Decimal Addition is performed with unlike signs or subtraction with like signs, External Overflow cannot occur and the End-Off-Carry indicates the second sum is the desired result. In either case, the End-Off-Carry is used in the same manner by the Decimal Add With Carry and the Decimal Subtract With Borrow instructions.

When performing a Decimal Add (or Subtract) using operands greater than ten digits in length, the following sequence must be followed:

(a) Divide each operand into ten-digit segments (60-bits per segment) starting from the least-significant digit in the operand. Each segment of each operand shall contain ten digits (unused digits in the most-significant segment must contain zeros) and the sign bit ($2^4$) shall be the same in each segment. Each segment to be used as the Y, Y+1 operand must be stored in two consecutive memory locations.

(b) Perform a Decimal Add (or Subtract) *Without Carry (Borrow)* on the least-significant segments of the two operands.

(c) Store the first sum in memory and perform Decimal Add (Subtract) on the remaining corresponding pairs of operand segments *With Carry (Borrow)* and store each sum (difference) in memory.

Because there is no way of determining the relative magnitudes of operands until the final add (or subtract) is completed, the Signs assigned to individual segments of the result may differ after an add with unlike Signs or a subtract with like Signs. Each segment add is performed independent of the others, with the exception of the End-Off-Carry propagation and each segment of the result may or may not be complemented and is assigned a Sign depending on the relative magnitudes of each segment pair in the original operands.

The Sign of the result is the same as the Sign of the most-significant segment in the result. Once the Sign is determined, it must be compared with the Sign of each segment in the result. When the Signs are equal, the segment is correct. When the Signs differ, the segment must be complemented by forming the 10's complement for the least-significant segment and the 9's complement for the other segments. Examples V and VI illustrate multiple-precision decimal arithmetic. For simplicity, three digit segments are used.

Example V is of particular interest because it illustrates (1) the significance of the End-Off-Carry during a subtract operation and (2) Sign propagation through segments equal to zero.

EXAMPLE V.—MULTIPLE-PRECISION DECIMAL ADDITION

| | Third Add | Second Add | First Add |
|---|---|---|---|
| | Segment Two Add With Carry | Segment One Add With Carry | Segment Zero Normal Add |
| $(A\phi)(Q\phi)$ | 616263 | 646566 | 677071 (+) |
| (Y)(Y+1) | 607007 | 666504 | 636201 (−) |
| | Strip-Zone and Sign bits and 9's complement $(A\phi)$ $(Q\phi)$. | Strip Zone and Sign bits and 9's complement $(A\phi)$ $(Q\phi)$. | Strip Zone and Sign bits and 10's complement $(A\phi)$ $(Q\phi)$. |
| | 100706 | 050403 | 020101 |
| | 001007−EOC− | 060504 | 030201 |
| First Sums | 101715 | 131107 | 050302 |
| Cor. Fact | 010707 | 060000 | 000000 |
| | 112624 | 211107 | 050302 |
| | 9's complement second sum (no End-Off-Carry). Strip Zone and Sign bit positions. Sign equals Sign of $(A\phi)(Q\phi)$ | Second sum is ok (End-Off-Carry). Strip Zone and Sign bit positions. Sign opposite Sign of $(A\phi)$ $(Q\phi)$ | 10' complement second sum (no End-Off-Carry). Strip Zone and Sign bit positions. Sign equals Sign of $(A\phi)$ $(Q\phi)$. |
| Final Sums | 000305 | 011107 | 040610 |
| Zone and Sign Bits. | 606060 | 606040 | 606060 |
| Results | 606365 ← | → 617147 | 646670 |
| | ↑ Different Signs | Same Signs | ↑ |

The program must now compare with the Sign of the most-significant segment (+) with the other two segments. The Sign of the first segment is positive so the segment is correct as is; however, the second segment (1) must be complemented (9's) which may be accomplished by means of the Decimal Complement instruction.

| | | | |
|---|---|---|---|
| Final Result | 606365 | 706062 | 646670 |
| | (+035) | (+802) | (+468) |

NOTE.—Checking by long-hand subtraction: +123456789 / −087654321

+035802468

EXAMPLE VI.—MULTIPLE-PRECISION DECIMAL SUBTRACTION

|  | Third add<br>Segment Two<br>Subtract<br>With Carry | Second Add<br>Segment One<br>Subtract<br>With Carry | First Add<br>Segment Zero<br>Normal<br>Subtract |
|---|---|---|---|
| (Aφ)(Qφ) | 616263 | 646560 | 646471 (+) |
| (Y)(Y+1) | 616263 | 646561 | 637067 (+) |
|  | Strip Zone and Sign bits and 9's complement (Aφ) (Qφ). | Strip Zone and Sign bits and 9's complement (Aφ) (Qφ). | Strip Zone and Sign bits and 10's complement (Aφ) (Qφ). |
|  | 100706 | 050411 | 050501 |
|  | 010203 | 040501 | 031007 |
| First Sum | 111111 | 111112 | 101510 |
| Cor. Fact | 070707←EOC— | 070706 | 010600 |
|  | 202020 (EOC) | 202020 | 112310 |
|  | Second sum is correct (End-Off-Carry). Strip Zone and Sign bit positions. Sign opposite Sign of (Aφ) (Qφ). | Second sum is correct (End-Off-Carry). Strip Zone and Sign bit positions. Sign opposite Sign of (Aφ) (Qφ). | 10's complement second sum (No End-Off-Carry). Strip Zone and Sign bit positions. Sign equals Sign of (Aφ) (Qφ). |
| Final Differences. Zone and Sign Bits | 000000 | 000000 | 000602 |
| Result | 606040 | 606040 | 606060 |
|  | 606040 | 606040 | 606062 |
|  | ↑ Same Signs ↑ |  |  |
|  |  | Different Signs |  |

The program must now compare the Sign of the most-significant segment (−) with the other two segments. The Sign of the second segment is negative so the segment is correct as is; however, the first segment must be complemented (10's) which may be accomplished by means of the Decimal Complement instruction.

| Final Result | 606040 | 606040 | 716350 |
|---|---|---|---|
|  | (−000) | (−000) | (−938) |

NOTE.—Checking by long-hand subtraction:
$$-123451387$$
$$+123450449$$
$$-000000938$$

By comparing the long-hand method and the machine method of performing multiple-precision Decimal Addition with both operands having like Signs or subtraction with unlike Signs, it is readily apparent that the End-Off-Carry corresponds to the carry between segments generated by the long-hand method. By comparing the long-hand method and the machine method of performing multiple-precision Decimal Addition with unlike Signs or subtraction with like Signs (see examples), note that an End-Off-Carry is generated where a borrow is *not* generated by the long-hand method and vice versa. This indicates that, under these conditions, the End-Off-Carry propagation is actually the propagation of a *No-Borrow* condition. Note also that this *No-Borrow* condition is analogous to a No-Overflow condition while the End-Off-Carry generated during Decimal Addition with like Signs and subtraction with unlike Signs is analogous to an Overflow condition.

In the Example VI (subtraction) the Sign of the result is correctly indicated by the two insignificant (equal to zero) segments, while the significant (not equal to zero) segment must be complemented by the program to obtain the desired result. Note that the Sign of the most-significant segment is determined by the presence or absence of an End-Off-Carry into that stage and any zero segment receiving an End-Off-Carry will also propagate an End-Off-Carry to the next more significant segment. This assures the correct Sign of the most significant segment regardless of the number and location of zero segments in the multi-segment.

Sign of Zero

The sign of the decimal result is determined as follows:

Opposite of the Sign of (Aφ) (Qφ) if:
  (a) it is not necessary to complement one of the operands before adding (or subtracting);
  (b) it is necessary to complement one of the operands before adding (or subtracting) and no End-Off-Carry is generated.

Opposite of the Sign of (Aφ) (Oφ) if:
  (a) it is necessary to complement one of the operands before adding (or subtracting) and an End-Off-Carry is generated.

In all cases when the result is not zero, the Sign of the result is correct (considering each segment independently during a multiple-precision operation) and can be readily predicted by long-hand computation. When the result is equal to zero, the above stated sign-determining conditions are followed; however, the resulting Sign is not as easily predicted as in the non-zero case. All possible combinations of zero generating operands are tabulated in Table IV along with the Signs of the results. Note that since the Aφ Qφ operand is always complemented in those cases when it is necessary to complement one operand, the Sign of the result depends not only on the relative Signs of the two operands but depends also on which operand is the Aφ Qφ operand, the type of operation being performed and whether the operation is with or without carry (or borrow).

TABLE IV.—ZERO RESULT SIGN ASSIGNMENT

| AφQφ | +0−0+0−0+N−N | |
|---|---|---|
| +Y, Y+1 | +0−0−0+0−N+N | |
| | +0−0−0+0 −0 +0 | Addition Without Carry. |
| AφQφ | +0−0+0−0+N−N | |
| −Y, Y+1 | +0−0−0+0+N−N | |
| | −0+0+0−0 −0 +0 | Subtraction Without Carry. |
| AφQφ | +*0*−0+0−0+N−N | |
| +Y, Y+1 | +0−0−0+0−N+N | Addition With Carry. |
| | +*0*−0+0−0 +0 −0 | (No End-Off-Carry Into Segment.) |
| AφQφ | +0−0+0−0+N−N | |
| −Y, Y+1 | +0−0−0+0+N−N | Subtraction With Borrow. |
| | +0−0+0−0 +0 −0 | (No End-Off-Carry Into Segment.) |
| AφQφ | −(N+1)+(N+1)−N   +N | |
| +Y, Y+1 | +N   −N   +(N+1)−(N+1) | Addition With Carry. |
| | −0   +0   +0   −0 | (End-Off-Carry Into Segment.) |
| AφQφ | −(N+1)+(N+1)−N   +N | |
| −Y, Y+1 | −N   +N   −(N+1)+(N+1) | Subtraction With Borrow. |
| | −0   +0   −0   +0 | (End-Off-Carry Into Segment.) |

$0 < (N)$ And $(N+1) \leq 10^{10}-1$

Special case

It will be recalled from above that the ten's complement is formed for the lowest order decimal digit when required. It will also be recalled that the ten's complement of 0 is considered internally as $12_8$. This condition results in erroneous operation of the system under certain cases, unless special circuitry is provided to account for the problem. An example of this problem will be illustrated, first without accounting for the special case, and second taking the special case into account. Since the special case is in the lowest order stage, a 3-digit example will suffice to illustrate the conditions. Zone bits and Sign bit will not be shown for this consideration, since they are treated as above. Consider the following Decimal Addition:

$$(A\phi)(Q\phi) = 976(-)$$
$$(Y)(Y+1) = 276(+)$$
$$\overline{700(-)}$$

The following sequence would result if no account were taken of the special case:

```
 0   2   4₁₀   (−) DEC COMP (Aφ)(Qφ).
 2   7   6₁₀   (+).
────────────
 2₈  11₈ 12₈   First Add.
 1    7   6    Correction Factor.
────────────
 3₈  20₈ 20₈   Second Add.
 3    0   0    Select Dec. Digits.
 6    9   0₁₀  (−) Since Signs Differ and no EOC, DEC COMP.
```

It can be seen that this result is not correct. The incorrect result arises due to the carry resulting from the lowest order stage, and the resultant digits of the correction factor. The following sequence illustrates the manner in which this special case can be accommodated:

```
 0   2   4₁₀   (−) DEC COMP (Aφ)(Qφ).
 2   7   6₁₀
────────────
 2₈  11₈ 12₈   First Add:
                 a. Lowest order sum = 12₈.
                 b. Signs Differ.
                 c. No EOC will be generated, therefore inhibit carry
                    from lowest decimal stage.
 0    0   6    Correction Factor.
────────────
 2₈  11₈ 20₈   Second Add.
 2₁₀  9₁₀ 0₁₀  Selecting Decimal Digits.
 7    0   0₁₀  (−) Since Signs differ and no EOC, DEC COMP.
```

This then results in the correct result.

A similar condition exists for the Decimal Subtract operation. The matter of sign handling determines the special case. A special flip-flop is utilized for decimal sign relationship storage. This flip-flop is designated S1–F/F, and will be described in detail below. The handling of the special case for both Decimal Addition and Decimal Subtraction is tied to this flip-flop, and is handled accordingly. If the S1–F/F is in a predetermined condition, and the result of the first binary add is $12_8$ for the lowest order decimal digit position, and if no EOC results, inhibit the generation of carry from stage $\phi$. The correction factor is then generated and the operation completed.

For the condition where the signs are different and the EOC results, and the sum of the least significant stage is $12_8$ then propagate the carry from the least significant stage.

DESCRIPTION OF EMBODIMENT

System consideration

Figure 7A:
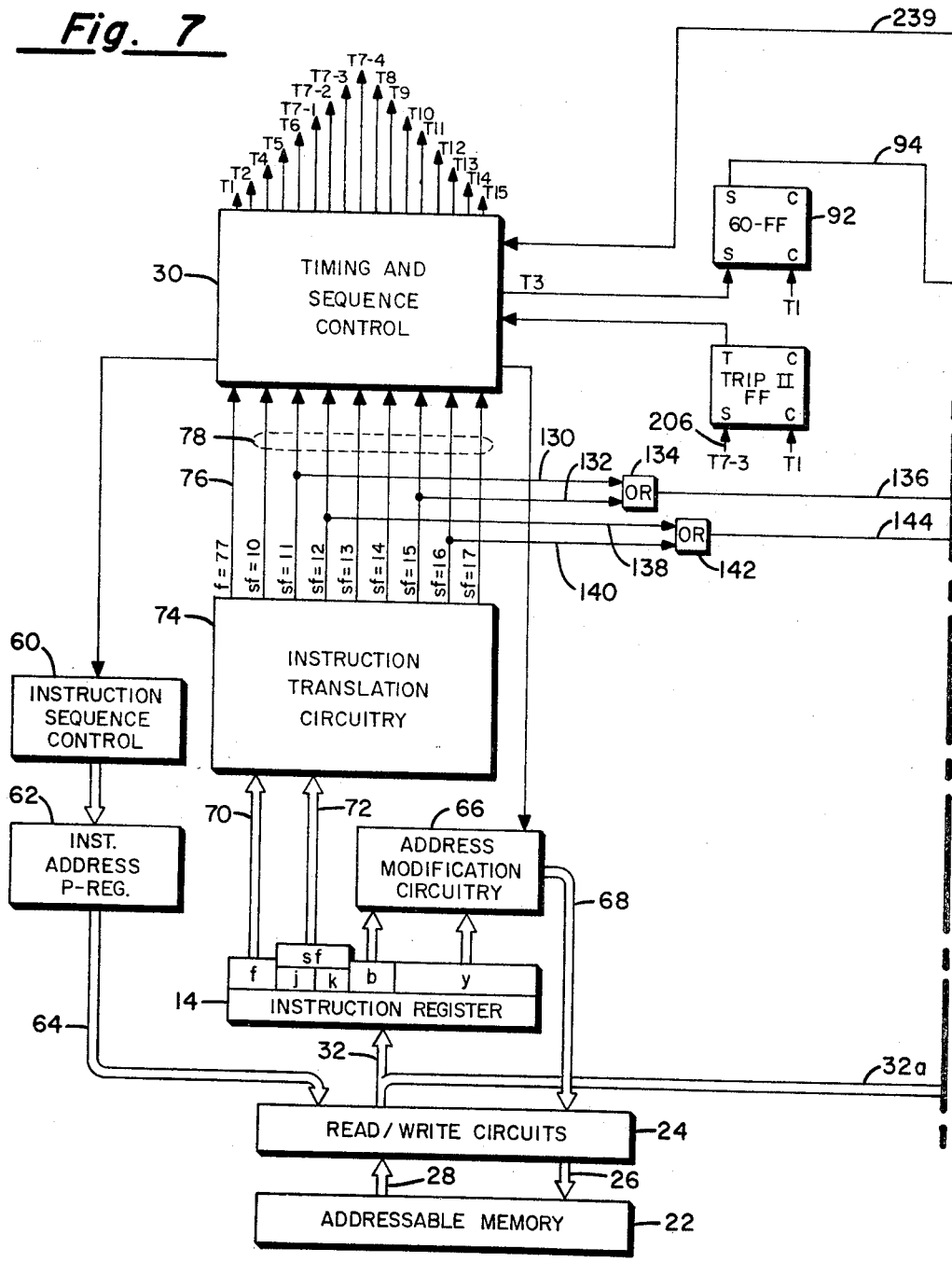
FIGURE 7 illustrates the relationship of FIGURE 7a and FIGURE 7b, and FIGURE 7c which together are a logic block diagram of the elements of a data processing system which embodies this invention.
Figure 7B:
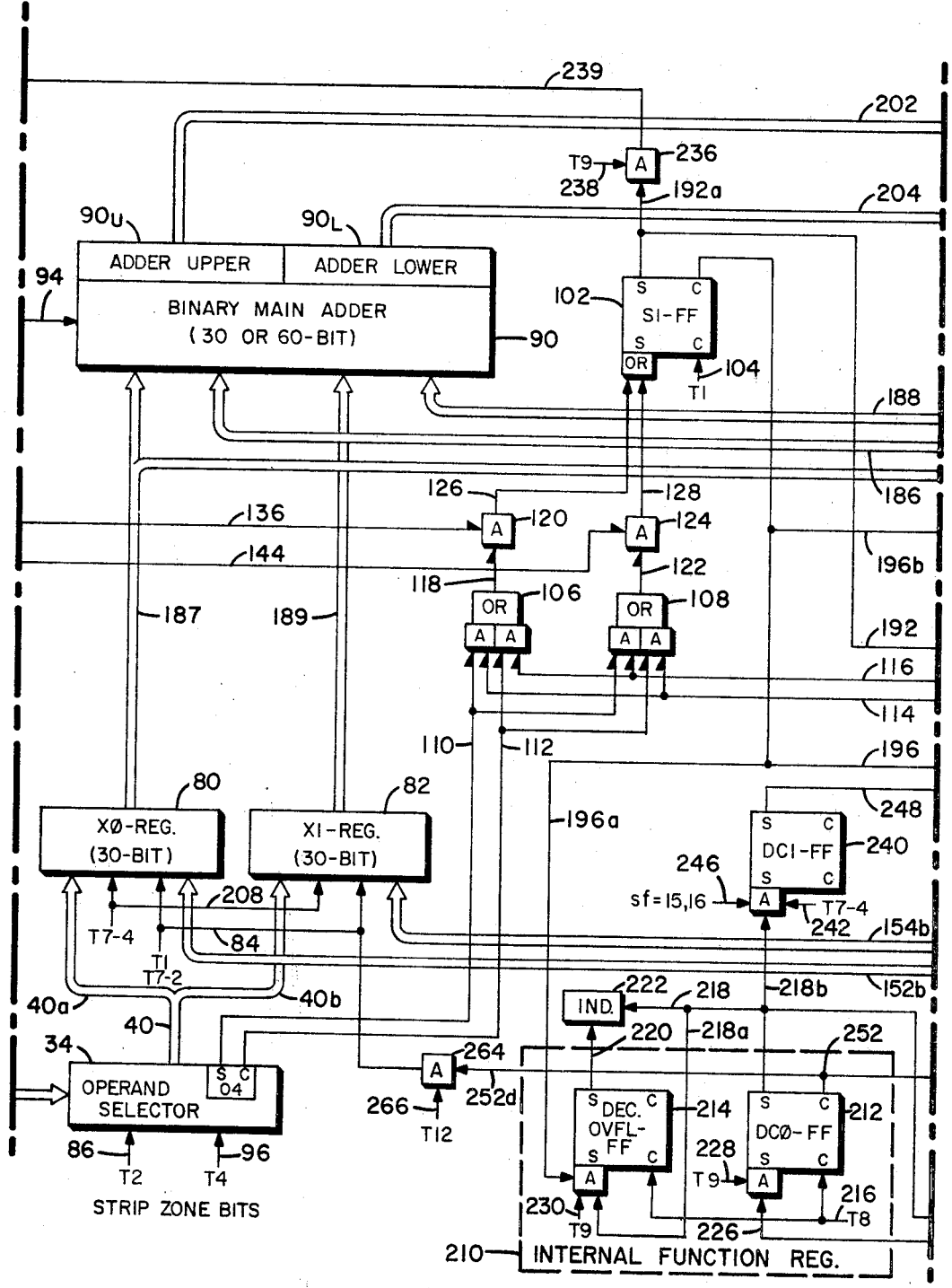
Figure 7C:
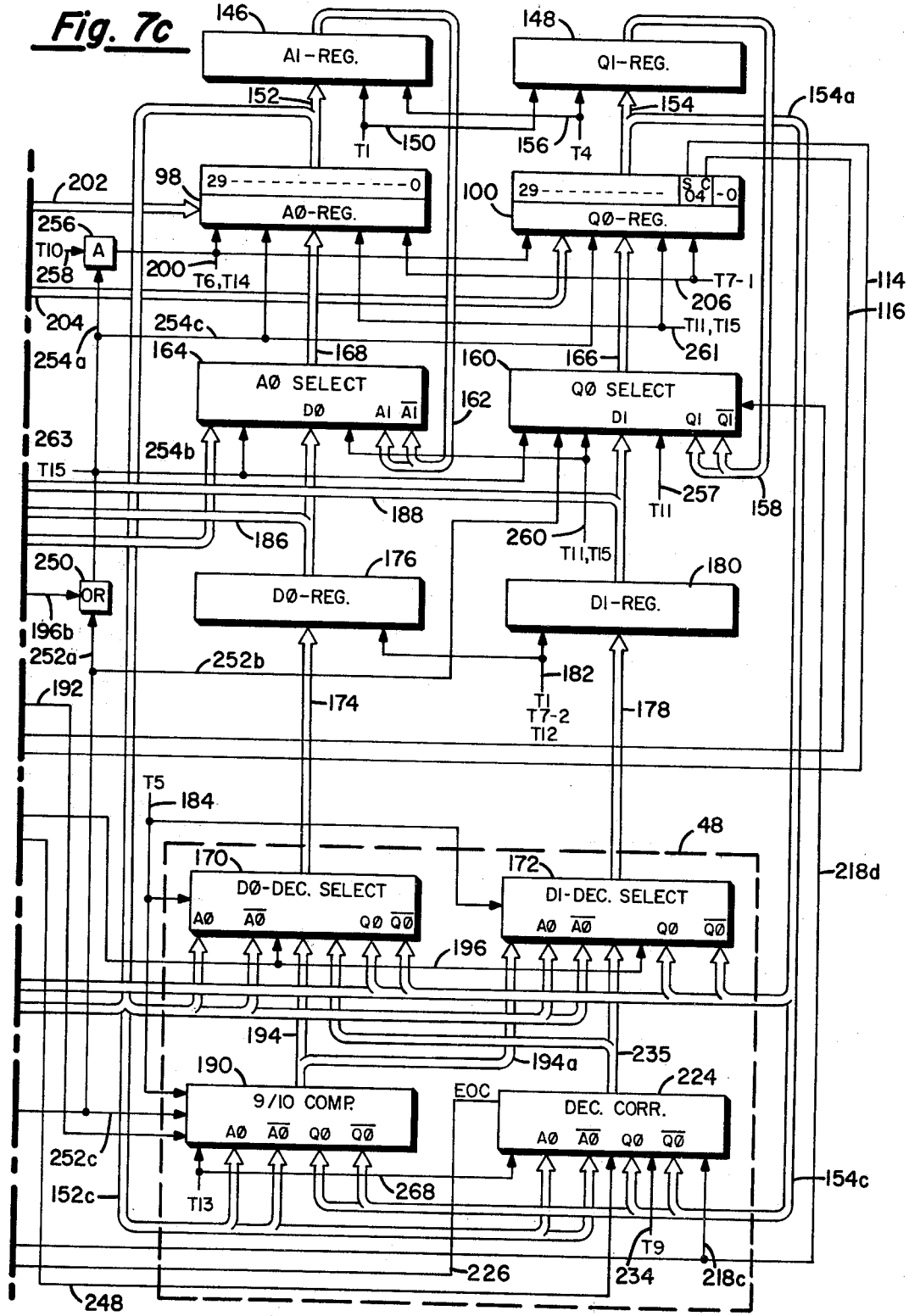

Having considered the system operation above, attention will be directed to the data processing system shown in logic block diagram form in FIGURE 7. For controlling the sequential procurement of instructions, an Instruction Sequence Control circuit 60 is utilized in conjunction with an instruction address P-Register 62. The address in Addressable Memory 22 is provided on cable 64 to Read/Write Circuits 24 and causes the instruction stored in Addressable Memory to be read out on cable 32 and to the Instruction Register 14. The instruction is then translated, as described above. The $b$-designator and the $y$-designator are each directed to the Address Modification Circuitry 66. The Address Modification Circuitry 66 operates to perform the B-Register modification and the base-relative addressing, if any, and to provide an absolute address on cable 68 to the Read/Write Circuits 24. The instruction sequencing and the address modification can be of the type described in copending patent application of W. C. Emerson, filed Jan. 27, 1967, with Ser. No. 612,256, now U.S. Patent 3,461,433 and assigned to the assignee of this invention. The function code designator $f$, and the subfunction designators ($sf$) are directed respectively on cables 70 and 72 to the Instruction Translation Circuitry 74. As mentioned briefly above, it is the function of the Instruction Translation Circuitry to respond to the $f$-designator for selecting the internal operation of the data processing unit. For the decimal instructions in this embodiment, the $f$-designator will be 77. Therefore, in response to a code of 77 received on cable 70, the Instruction Translation Circuitry 74 will pick one of the possible decimal instructions. It is the function of the $sf$-designator to select between the possible decimal instructions. Therefore, when a function code of 77 is provided to the Instruction Translation Circuitry and a sub-function code is also provided thereto, it operates to select a designated one of the possible output lines. An output signal indicative of a function code of 77 is provided on output line 76 to the Timing and Sequence Control 30. In response to the $sf$-designator, one of lines 78 will be enabled and will provide a second control signal to the Timing and Sequence Control circuitry 30. It should be noted that during any one instruction execution sequence, only one of lines 78 will be activated. As described above, it is the function of the Timing and Sequence Control 30 to provide timing signals for controlling the operation of the data processing unit. The timing periods illustrated will be described below under the heading TIMING SEQUENCE. It should be understood that the timing periods designated as T1 through T15 are indicative of timing intervals. This indicates that more than one clock pulse may occur during the respective periods and that the periods may vary in time duration, or in the number of specific timing signals for each such period. The timing pulse period numbering sequence is merely indicative of the sequence of events and the sequence of control that exists. A specific time and timing configuration is not shown since it will vary depending upon the access rate of the Memory Section 10 and the operational rate of the circuit elements chosen. Development of such specific timing within the framework established by the time periods is well within the skill of one skilled in the art.

The Operand Selector 34 receives operands from the Memory Section 10 on a branch 32a of cable 32. The Operand Selector 34 is the gating network which selects one of two possible paths 40a or 40b for transferring all, or selected ones, of the binary digits presented to the Operand Selector from the Read/Write Circuits 24. Transmission cable 40a is coupled to the X$\phi$-Register 80, and cable 40b is coupled to the X1-Register 82. An initial operation in the execution of a decimal instruction is accomplished during timing period T1, and involves clearing the arithmetic register. A control pulse is applied to line 84 during this timing period and results in clearing the X$\phi$- and X1-Registers. Following the clearing of the registers, and during timing period T2 a control signal is provided on line 86 for enabling the transfer of the binary coded decimal digit stages on cable 40a into the X$\phi$-Register 80. Since only BCD digits are gated through, this effects a stripping of the Zone bits from the half-operand read from address Y into the Operand Selector 34. By this time, it has been determined by the Instruction Translation Circuitry 74 that a decimal instruction is to be executed. Therefore, Timing and Sequence Control 30 issues a control signal on line 88 during timing period T3 which effects the setting of a flip-flop 92 which partially controls the operation of the Binary Main Adder 90. This flip-flop is designated the 60–F/F and operates to convert the Binary Main Adder 90 from a 30-bit adder to a 60-bit adder when set. The signal from the set side is provided on line 94. The Binary Main Adder 90 may be of the type described in U.S. Patent Number 3,234,370 to G. J. Erickson entitled Segmented Arithmetic Device, or any other well-known parallel binary adder. It is readily apparent that the control signal provided by 60–F/F operates to alter the End-Around Borrow path (since it is a subtractive adder) within the Binary Main Adder from that of a 30-bit add to that of a 60-bit add. Having loaded the stripped most significant portion of the decimal operand in the X$\phi$-Register, the Address Modification Circuitry 66 operates to select the next sequential address in the Addressable Memory 22. This results in the least significant portion of the decimal operand being read out on cable 32a to the Operand Selector 34. Under these circumstances, Timing and Sequence Control 30 operates to provide a control signal on line 96 which operates to transfer the binary coded decimal digits only on cable 40b into the X1-Register 82. At this time, the total decimal operand less Zone and Sign bit is stored in X$\phi$ and X1. The output terminals of X$\phi$ are coupled to the upper 30-bits of the Binary Main Adder via cable 187, and X1 is coupled to the lower 30-bits via cable 189.

It will be recalled from the discussion above, that one of the decimal operands is stored with the most significant portion in the A$\phi$-Register 98 and the least significant half in the Q$\phi$-Register 100. During the time of stripping the Zone bits and Sign bit from the least significant half and transferring the decimal digits to the X1-Register, it is necessary to compare the decimal sign stored in Q$\phi$ and the decimal sign read from address Y+1. The result of this comparison will ultimately be stored in a flip-flop designated S1–F/F, labeled 102. S1–F/F is cleared during clear period T1 by receiving a signal at the clear input terminal on line 104. Logic circuit 106 is utilized for determining the condition for setting S1–F/F for the Decimal Add and the Decimal Add With Carry instructions, and logic circuit 108 is utilized for determining the conditions for setting S1–F/F for the Decimal Subtract and Decimal Subtract With Borrow instructions. The set value of the decimal sign (04 stage) received in the Operand Selector 34 is passed on line 110 to circuits 106 and 108. The clear value of the operand passing through Operand Selector 34 is directed to logic circuits 106 and 108 on conductor 112. The set value of the Q$\phi$ decimal sign is passed on line 114 to logic circuits 106 and 108. Finally, the clear value of Q$\phi_{n4}$ is directed to these logic circuits on conductor 116. Referring to the description of the truth-tables in FIGURE 4b, it can be seen that logic circuit 106 will provide an output signal on conductor 118 which will activate logic circuit 120 only when the value of the respective decimal signs are not equal. Further, a consideration of the logic performed by circuit 108 is such that an activating signal will be provided on line 122 to logic circuit 124 only when the value of the respective decimal signs are the same. In order for logic circuits 120 and 124 to provide activating signals on their respective output lines 126 and 128 it is necessary that a control signal be applied thereto. When either a Decimal Add or a Decimal Add With Carry subfunction is translated (sf=11 or 15), active signals will be provided on lines 130 or 132 respectively, to OR circuit 134. When OR circuit 134 receives one of these two signals it will provide an enabling signal on conductor 136 to logic circuit 120 for causing S1–F/F to be set when the signs of the decimal operands are not equal. Alternatively, if a Decimal Subtract or Decimal Subtract With Borrow are translated with Instruction Translation Circuitry 34 (sf=12 or 16), an activating signal will be provided on either lines 138 or 140 respectively, to OR circuit 142. Under these conditions, an activating signal is provided on line 144 to logic circuit 124 for causing the S1–F/F to be set when the signs of the decimal operands are the same. In the case of the Decimal Adds, if the decimal signs of hte operands are the same, S1–F/F is not set; and in the case of the Decimal Subtracts, if the signs of the decimal operands differ S1–F/F is not set.

Included in the Arithmetic Section is a pair of auxiliary registers including an A1-Register 146 and a Q1-Register 148, each of which are cleared during timing period T1 by the clear pulse received on line 150. The input terminals of the A1-Register 146 are coupled to the output terminals of the A$\phi$-Register 98 by cable 152. The input terminals of the Q1-Register 148 are coupled to the output-terminals of the Q$\phi$-Register 100 by cable 154. During timing period T4, an enable signal is coupled to the A1-Register and the Q1-Register by control line 156 and causes the upper half of the decimal operand to be transferred to the A1-Register 146, and the least significant half of the decimal operand to be transferred to the Q1-Register 148. This operates to store the Zone bits and the Decimal Sign bit of the decimal operand originally stored in A$\phi$ Q$\phi$.

Both the set and clear signals from the respective stages of the Q1-Register are transferred on cable 158 as a set of input terminals to the Q$\phi$ Select circuitry 160. Similarly, the set and clear output terminals of the A1-Register are transmitted on cable 162 as a set of inputs to the A$\phi$ Select circuitry 164. The A$\phi$ Select and Q$\phi$ Select each are comprised of a plurality of gating circuits of a type well-known in the art for transferring all or selected ones of the signals applied thereto out on output cables. The Q$\phi$ Select 160 is coupled to respectively arranged stages of the Q$\phi$-Register 100 via cable 166 and the A$\phi$ Select is coupled to respectively arranged stages of the input terminals of the A$\phi$-Register 98 via cable 168.

Included in the Decimal Logic Network 48 is the D$\phi$ Decimal Select 170 and the D1 Decimal Select 172. It is the function of the D$\phi$ Decimal Select 170, in response to the control input signals, to select the appropriate ones of the data signals to be sent on cable 174 to the D$\phi$-Register 176. Similarly, the D1 Decimal Select 172 operates, in response to the control signals received, to select the form of the data signals to be provided on cable 178 as input signals to the D1-Register 180. The D$\phi$- and D1-Registers are cleared during timing period T1 by receiving a clear signal on control line 182. During timing period T5, the decimal digits of the operand stored in A$\phi$ Q$\phi$ are passed on lines 152a and 154a respectively to the D$\phi$ Decimal Select 170 and the D1 Decimal Select 172. A control signal received during timing period T5 on control line 184 operates to select the appropriate set of gates in D$\phi$ Decimal Select and D1 Decimal Select for passing the decimal digits only on cables 174 and 178 into the decimal stages of the D$\phi$-Register 176 and the D1-Register 180. It will be noted that by transferring only the decimal digits, that in effect these Zone and Sign bits are stripped. Since D$\phi$ and D1 were originally cleared, the Zone stages are in the cleared state. One of the destinations of the output from the D$\phi$-Register 176 is to the upper 30-bits of the Binary Main Adder 90 via cable 186. Similarly, the D1-Register 180 is coupled to the Binary Main Adder at the lower significant 30-bit positions via cable 188. The X$\phi$-Register is coupled via cable 187 to the upper 30-bit positions of the Binary Main Adder, and the X1-Register is coupled via cable 189 to the lower 30-bit positions of the Binary Main Adder. At this time, it can be seen that two 60-bit binary operands are presented to the Binary Main Adder 90 in parallel. The decimal digits from the X$\phi$-Register 80 and the D$\phi$-Register 176 are added in the upper 30-bit positions, and the decimal digits from the X1-Register 82 and the D1-Register 180 are added at the lower 30-bit positions. The total result of the first binary add are ultimately available at the Adder Upper 90$_U$ and the Adder Lower 90$_L$. It should be noted here that as the result of first binary add binary digits may have spilled over into the Zone bit positions.

The nature of the binary coded decimal digists loaded in the D$\phi$-Register 176 and the D1-Register 180 is controlled by the state of the S1–F/F. Both the set and clear values from the stages of the A$\phi$-Register 98 and the Q$\phi$-Register 100 are directed to the 9/10 Complement circuitry 190. It is the function of the 9/10 Complement circuitry to form either the 9's complement or the 10's complement of an operand submitted thereto. During timing period T5 the control signal received on line 184 also enables the 9/10 Complement circuitry 190. The selection of whether set value of the operand in the A$\phi$-Register will be transferred to the D$\phi$-Register, or whether the 9's complement will be sent to D$\phi$ is determined by the state of S1–F/F as mentioned above. When this flip-flop is in the set condition, an enabling pulse will be provided on control line 192 thereby enabling the 9's complement to be generated and passed out on cable 194 to the D$\phi$-Decimal Select circuitry 170 and the 10's complement to be sent on cable 194a to the D1-Decimal Select 172. When S1–F/F is clear, an enabling signal is provided on control line 196, thereby enabling the straight transfer of the set value of the operand stored in the A$\phi$ and Q$\phi$. The reason the 10's complement is utilized for the transfer to D1-Decimal Select is that the lowest ordered digit is the least significant half, and with this system must be the 10's complement.

Having established the form of the operand to be loaded in D$\phi$ and D1, and having initiated the add operation, it is necessary during timing period T6 to clear A$\phi$ and Q$\phi$. This is accomplished by issuing a clear signal on clear line 200. This is necessary to ready A$\phi$ and Q$\phi$ for receiving the result of the first binary add.

The 30-bit value of the Adder Upper 90$_U$ is carried on cable 202 as an input to the A$\phi$-Register and the 30-bit value resulting at the Adder Lower 90$_L$ is carried on cable 204 to the Q$\phi$-Register. The effect of the respective binary digits on A$\phi$ and Q$\phi$ is dependent upon the enabling of the input gate circuits which are a part of the registers.

A sequence of events takes place during the T7 timing period such that at T7–1, a control signal is received on control line 206 causing the entire result of the first binary add to be loaded in A$\phi$ and Q$\phi$. During timing period T7–2, D$\phi$ and D1 are caused to be cleared by receiving the clear signal on line 182, and X$\phi$ and X1 are cleared by receiving a clear signal on clear line 84. During timing period T7–3 it is necessary to initiate a second pass of the timing sequence in the Timing and Sequence control 30 by issuing a control pulse to cause the Trip-II F/F to be set via control line 206. Finally, during the T7 period at T7–4, it is necessary to transfer the contents of A$\phi$-Register 98 and Q$\phi$-Register 100 to X$\phi$ and X1 respectively. This is accomplished by having the output terminals of the A$\phi$-Register coupled to the input terminals of the X$\phi$-Register via cable 152b, and the output of the Q$\phi$-Register coupled to the input of the X1-Register via cable 154b. Therefore when Timing and Sequence Control circuitry issues the enable signal to control line 208, the result of the first binary add is loaded into the X$\phi$-Register and the X1-Register.

The Internal Function Register 210 is a register comprised of a plurality of flip-flops which are utilized at various stages of the internal operation. For the decimal operation only two of these flip-flop stages are utilized. Accordingly, only these flip-flops will be described and the other stages will not be treated. A first of these indicator stages is designated as the f4-designator, and is a flip-flop which is designated as such DC$\phi$–F/F, and labeled 212. It is the function of the f4-designator to an indication that there has been an internal overflow which will be designated End-Off-Carry (EOC) as defined above. This designator operates while the decimal instruction is being executed. A second indicator flip-flop is the f5-designator. This is the Decimal Overflow flip-flop, labeled 214, and will be referred to as DEC OVFL–F/F. During timing period T8, a control signal will be applied to control line 216 which will cause the f4- and f5-designators to be set to an initial state. The state of the DC$\phi$–F/F and DEC OVFL–F/F indicators are directed on lines 218 and 220 respectively to indicating devices 222. These indicating devices can be in the form of instrument panel lights or the like and are utilized to determine the state of the binary coded decimal pattern should a fault occur. The set state of DC$\phi$–F/F is also directed to the f5-designator set input on conductor 218a.

During the Decimal Add or Decimal Subtract operations, it is necessary for the Decimal Logic Network 48 to provide a correction factor for each stage and to provide for interdigit decimal carries as described above. This function is shown as the Decimal Correction circuitry 224. The decimal correction circuitry receives inputs from A$\phi$-Register 98 and Q$\phi$-Register 100 via cables 152c and 154c respectively. Upon the completion of the decimal correction operation, if carry or borrow operations cannot be satisfied wihin the operand, an End-Of-Carry signal will be generated. The EOC signal is carried on conductor 226 as the setting input to DC$\phi$–F/F. During timing period T9 the set gate for DC$\phi$–F/F is enabled by a pulse on line 228, and if an EOC signal is present will cause the DC$\phi$–F/F to be set. During the same timing period T9, the f5-designator is enabled for being set by a signal on control line 230. The conditions which control the setting of DEC OVFL–F/F are that the DC$\phi$–F/F be set, thereby providing a signal on line 218a and that the S1–F/F be clear. The other input to the set gate is therefore coupled to the clear output terminal of S1–F/F via line 196a. During timing period T9, the enable signal applied to control line 234 enables the transfer of the decimal correction factor from the Decimal Correction circuitry 224 to D$\phi$ D1 via cables 235. Note that for the special condition, if S1–F/F is set and if the result of the first binary add in stage $\phi$ is 12$_8$, and if DC$\phi$–F/F is clear the propagation of the carry form stage $\phi$ is inhibited as described above. Finally during timing period T9, the state of S1–F/F is probed for determining the necessity of extending the sequence. The set terminal is coupled via conductor 192a to AND circuit 236 and the control pulse is coupled to AND circuit 236 and the control pulse is coupled to AND circuit 236 via control line 238. Therefore, when S1–F/F is set a signal will be passed through AND circuit 236 on conductor 239 to cause Timing and Sequence Control 30 to extend the sequence. During timing period T9, when the enable signal is applied to control line 234, the Decimal Correction circuitry 224 enables the transfer of the correction factor through D$\phi$ Select 170 and D1 Select 172 into the D$\phi$-Register 176 and the D1-Register 180. This correction factor is combined with the result of the first binary add, which resides in the X$\phi$-Register 80 and the X1-Register 82, in the Binary Main Adder 90.

At this time, the condition of the Decimal Add With Carry or Decimal Subtract With Borrow sequences should be considered. It will be recalled that during timing period T8 that the f4- and f5-designators were cleared. For the Decimal Add With Carry or Decimal Substract With Borrow, it is necessary to have a means for carrying over internal decimal overflows from the lower ordered significant segments to the higher ordered significant segments. With both designators being cleared during timing period T8, it is necessary to provide a means for trapping the condition in which a carry signal must be injected in the lowest ordered stage of the Decimal Correction circuitry 224. This is accomplished by adding an auxiliary flip-flop DC1–F/F, labeled 240. The set input terminal of DC1–F/F is coupled to the control line 242 which carries an enable signal during timing period T7–4. Another input terminal to the set gate is coupled to the set output terminal of DC$\phi$–F/F via conductor 218b. Finally, an enable signal is generated by Instruction Translation Circuitry 74, and applied to control line 246 whenever a subfunction of 15 or 16 is generated. These combinations of signals causes the DC1–F/F to be set to the state of DC$\phi$–F/F. Therefore, if on the previous decimal operation the DC$\phi$–F/F was set, this state will be injected in DC1–F/F. The set output terminal of DC1–F/F is coupled via conductor 248 as the decimal carry to the lowest ordered stage via Decimal Correction circuitry 224.

Returning to the consideration of the sequence, during timing period T10 it is necessary to clear A$\phi$ Q$\phi$ if either S1–F/F is clear or DC$\phi$–F/F is clear. To accomplish this, the clear terminal of S1–F/F is directed on conductor 196b to OR circuit 250 in conjunction with the clear output signal from DC$\phi$–F/F on conductor 252a. The output from OR circuit 250 is directed on conductor 254a to AND circuit 256. The timing pulse is supplied to AND circuit 256 on control line 258 thereby causing the clear signal to be applied to the A$\phi$ and Q$\phi$ registers.

During timing period T11, the Sign bit stored in the Q1–Register 148 is transferred to Q$\phi$. To accomplish this, a control signal is applied to control line 257 for enabling the appropriate gate in Q$\phi$–Select 160. When S1–F/F is clear or if DC$\phi$–F/F is clear, the enabling signal will be provided on control line 254b in conjunction with a timing signal on line 260 to transfer the Zone bits from Q1 to Q$\phi$, and from A1 to A$\phi$. At this time also, an enable signal will be provided on line 254c along with a control signal on line 261, which will transfer the binary coded decimal stages from the Binary Main Adder to A$\phi$ Q$\phi$. This is also conditioned by a control enable signal on control line 260. It should be noted here that no Zone bit or Sign bit signals are transferred from the adder. This is a different gate selection from the previous transfer from the Binary Main Adder 90 of the first binary add to the A$\phi$–Register and Q$\phi$–Register. The transfer of the binary coded decimal stages from the Binary Main Adder 90 results in the combination of the first binary add and the second binary add being inserted in A$\phi$ Q$\phi$, along with the Zone and Sign bits. In the event that S1–F/F is not set, this is the end of the normal sequence and the result in A$\phi$ Q$\phi$ is the result of the Decimal Add or Decimal Subtract. However, if S1–F/F was set the sequence has been extended during timing period T9 and an end-correction sequence must be gone through.

During timing period T12, a clear signal is applied to clear line 182 for clearing the D$\phi$–Register 176 and the D1–Register 180. The determination of whether X$\phi$ and X1 are cleared is dependent upon the state of DC$\phi$–F/F. If DC$\phi$–F/F is clear, X$\phi$ and X1 are cleared. This is accomplished by coupling the clear output terminal of DC$\phi$–F/F via conductor 252d to AND circuit 264. The enable signal is applied to control line 266 for passing the clear signal onto clear line 84.

During timing period T13, it is necessary to accommodate either the decimal complementing of the result stored in A$\phi$ Q$\phi$, or to accommodate the special case defined above. If DC$\phi$–F/F is clear, the condition is satisfied to transfer the decimal complement from A$\phi$ Q$\phi$ to D$\phi$ D1. This is accomplished by coupling the clear output terminal of DC$\phi$–F/F to the 9/10 Complement circuitry 190 via conductor 252c. Simultaneously, an enabling signal is provided on line 268 thereby providing timing control for both the 9/10 Complement circuitry 190 and the Decimal Correction circuitry 224. In the event that the DC$\phi$–F/F is set, it is necessary to tranfer the decimal correction factor to D$\phi$ D1. This is accomplished by coupling the set output terminal of DC$\phi$–F/F via line 218c to the Decimal Correction circuitry 224, thereby making this selection through the gating network. From timing period T12, it will be recalled that if D$\phi$–F/F is clear, X$\phi$ X1 is cleared. Under these conditions, the clear value of X$\phi$ X1 are provided to the Binary Main Adder in conjunction with the decimal complement of A$\phi$ Q$\phi$ which resides in D$\phi$ D1. This results in the complement value being transmitted through the Binary Main Adder 90 unaltered. In the alternate circumstance, X$\phi$ X1 is not cleared and is combined with the decimal correction factor in the Binary Main Adder 90.

In order to load the new value in A$\phi$ Q$\phi$, it is first necessary to clear these registers. This is accomplished during timing period T14 when a clear signal is applied to clear line 200 resulting in the clearing A$\phi$ Q$\phi$. During timing period T15, a control signal is provided to control line 260 for transferring the Zone bits from A1 Q1 to A$\phi$ Q$\phi$. During this same timing period it is necessary to establish the order of the decimal sign. If DC$\phi$–F/F is clear, a signal is provided on line 252b for transferring the value of Q1$_4$ to Q$\phi_4$. In the alternative, if DC$\phi$–F/F is set a signal is passed on control line 218d from the set side of DC$\phi$–F/F to the Q$\phi$–Select circuitry for causing the complement of the value of Q1$_{04}$ to be transferred to Q$\phi_{04}$. Finally, during timing period T15 a control signal is applied to control line 263 for causing the decimal digits to be transferred from the Binary Main Adder 90 into the binary coded decimal digit stages of A$\phi$ Q$\phi$. At this time the sequence is completed.

Having considered the operational portions of the data processing unit which includes an embodiment of the subject invention, along with the data transfer paths and control paths, the following TIMING SEQUENCE is illustrative of the sequence of events described above.

TIMING SEQUENCE

Decimal Add 77–11
Decimal Subtract 77–12
Decimal Add With Carry 77–15
Decimal Subtract With Borrow 77–16

T1—Clear Arithmetic Registers
T2—(Y) to X$\phi$ (Strip Zone Bits)
T3—Enable 60-bit Add
T4—(A$\phi$) (Q$\phi$) to A1 Q1 (Stores Zone & Sign)
    (Y+1) to X1 (Strip Zone Bits)
    Decimal Adds: Test Decimal Sign (Y+1):
        Set S1–F/F when (Q$\phi_{04}$)≠(OP Sel. 04) for (Y+1)
    Decimal Subtracts: Test Decimal Sign (Y+1):
        Set S1–F/F when (Q$\phi_{04}$)=(OP Sel. .04)
T5—Test Decimal Sign:
    (a) S1–F/F Not Set, Decimal Stages of (A$\phi$)(Q$\phi$) to D$\phi$D1 on D$\phi$, D1 SEL DEC XMIT EN
    (b) S1–F/F Set, 9's COMP (A$\phi$) to D$\phi$ & DEC COMP (Q$\phi$) to D1 on D$\phi$, D1 SEL DEC COMP EN & 10's LOWER EN
T6—Clear A$\phi$, Q$\phi$
T7–1—Adder Upper to A$\phi$, Adder Lower to Q$\phi$ (First Binary Add)
  –2—Clear D$\phi$, D1, X$\phi$, X1
  –3—Initiate Timing Sequence second pass—Set TRIP–II F/F
  –4—(A$\phi$) to X$\phi$, (Q$\phi$) to X1; For sf= 15, 16, DC$\phi$–F/F to DC1–F/F
T8—Clear DC$\phi$–F/F (f4), Clear DEC OVFL–F/F (f5)
T9—On EOC Set DC$\phi$–F/F
    Set DEC OVFL–F/F When EOC & S1–F/F Clear
    Transfer DEC CORR TO D$\phi$D1
        Enabled by D$\phi$ 01 DEC CORR EN
    NOTE: If S1–F/F Set and if result of first binary add in stage $\phi$ is 12$_8$, and DC$\phi$–F/F is Clear, inhibit propagation of carry from stage $\phi$.
    S1–F/F Set Enable extended sequence for end-correction
T10—Clear A$\phi$, Q$\phi$ when S1–F/F Clear or DC$\phi$–F/F Clear
T11—Transfer Decimal Sign (Q1$_{04}$) to Q$\phi_{04}$
    When S1–F/F Clear or DC$\phi$–F/F Clear:
        (a) Transfer Zone Bits (Q1) to Q$\phi$ & (A1) to A$\phi$
        (b) Transfer Decimal Bits (Non-Zone) from Adder to A$\phi$ Q$\phi$
    Note: End of normal Sequence—If S1–F/F Set, sequence extended during T9

T12—Clear D$\phi$ D1 & Clear X$\phi$, X1 when DC$\phi$–F/F Clear
T13—Transfer either decimal complement of (A$\phi$) (Q$\phi$) or DEC CORR to D$\phi$ D1:
  (a) DC$\phi$–F/F Clear—Tranfer Decimal Complement from (A$\phi$) (Q$\phi$) to D$\phi$ D1 (D$\phi$ D1 SEL DEC COMP EN & 10's LOWER EN)
  (b) DC$\phi$–F/F Set—Transfer enabled by D$\phi$ D1 SEL DEC CORR EN
T14—Clear A$\phi$ Q$\phi$
T15—(A1)(Q1) Zone bits to A$\phi$ Q$\phi$
  Set Decimal Sign:
    (a) DC$\phi$–F/F Clear: (Q1$_{04}$) to Q$\phi_{04}$
    (b) DC$\phi$–F/F Set: $\overline{(Q1_{04}}$ to Q$\phi_{04}$
  Adder Decimal to A$\phi$ Q$\phi$ (No Zone bits)

Having considered the hardware implementation of the subject invention, along with the sequential control operation, reference to FIGURE 6 illustrates a logic flow diagram of the steps involved in performing the Decimal Add or Decimal Subtract instructions. This flow diagram is a functional representation of the operations necessary in performing these decimal instructions. It can be seen that one operand is stored in A$\phi$ Q$\phi$, as represented by block 300, and the other operand is stored in Y and Y+1, as indicated in block 302. The Zone and Sign bits are stripped from the A$\phi$ Q$\phi$ operand and stored, as indicated in in block 304. The Zone and Sign bits are stripped from the other operand and discarded, as indicated in block 306. For a Decimal Add operation, path 308 is taken wherein a test of the signs 310 results in a setting of the S1–F/F flip-flop if the signs are not alike, as indicated by block 312. Alternatively, if a Decimal Subtract operation is enabled, as indicated by line 314, the test of the decimal signs 316 results in the S1–F/F flip-flop being set 318 when the signs are alike. From this juncture, the operation for both Decimal Add and Decimal Subtract is the same. In order to determine the nature of the operand to be sent to the adder, the S1–F/F is tested 320. If the flip-flop is set, the decimal complement of the operand stored in A$\phi$ Q$\phi$ is taken to the adder 332. Alternatively, if the S1–F/F is not set, the valve of the operand stored in the A$\phi$ Q$\phi$ is taken to the adder 324. The first binary sum of the value stored in X$\phi$ X1 and the value presented to the binary adder as a result of testing the S1–F/F flip-flop is formed 326, and the first binary sum transferred to X$\phi$ X1. The decimal carries are propagated 328 and the carry from the most significant position, if any, is set into the DC$\phi$–F/F flip-flop 330. Depending upon the condition of the S1–F/F and DC$\phi$–F/F an end correction may be required 332. A decimal correction factor is added to the first binary sum 334 and the decimal digits take into A$\phi$ Q$\phi$. In the event S1–F/F is set, as indicated by the decision operation 336, and if DC$\phi$–F/F is set, as indicated by decision element 338, the complement of the original sign and an end correction to accommodate the special case of the least significant digit is executed, as indicated by block 340. The original Zone bits are restored to A$\phi$ Q$\phi$ 342. Alternatively, if S1–F/F is not set the original sign is selected 344 and the Zone bits are restored 342. Finally, if S1–F/F is set and DC$\phi$–F/F is not set the decimal complement is directed to A$\phi$ Q$\phi$ 346 and the Sign is restored 344 along with the Zone bits 342.

Decimal logic network

The detail circuitry that performs the decimal complement functions, forms the decimal correction factors, and tests for the special case is shown in FIGURE 8 and FIGURE 9a through FIGURE 9d. The circuitry is shown in logic block diagram form with the circuits being selected from those illustrated in FIGURE 4a through FIGURE 4f.

Figure 8:
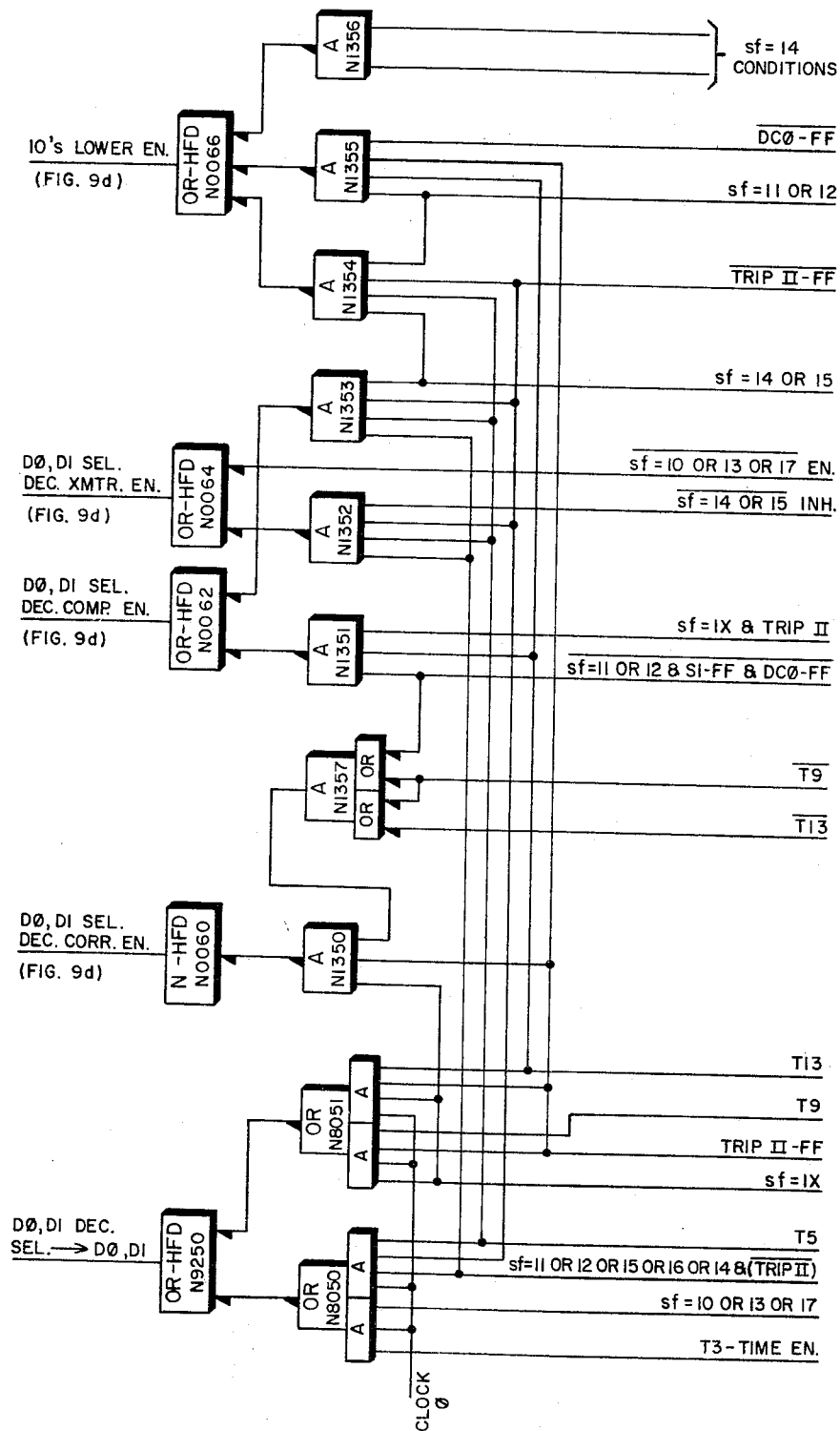
FIGURE 8 is a logic block diagram of the control portion of the decimal network.

FIGURE 8 performs the control operations for selecting which function will be activated. The circuitry operates in response to a combination of the timing signals, the control flip-flops and the subfunctions, to select from a plurality of control enable signals. The specific logic circuits for deriving these input signals are not shown here. The control flip-flops and the subfunctions were described along with timing considerations above. The input signal requirements are set fortth in Boolean expressions which are readily understandable to those skilled in the art. By way of example, consider $sf=14$ OR 15. This indicates that a signal will be present on the designated line when either of these subfunctions are decoded. Further, consider $\overline{sf=11 \text{ OR } 12}$ & S1–F/F & DC$\phi$–F/F. This statement is a Boolean expression which indicates the negation of the signal will be on the designated line when the conditions are met that a $sf$ OF 11 or 12 are determined, and S1–F/F and DC$\phi$–F/F are both set. Finally, in considering the timing period signals, a signal of T13 would be taken from the set side of a flip-flop set during timing period T13, and the $\overline{T13}$ signal would be taken from the clear side of the same flip-flop and is the complement of T13. It is believed the foregoing adequately sets forth the nomenclature system utilized in designating the various input signals.

Each of the logic circuit symbols includes a designation of the logic function for defining the circuit operation; and, further, includes an alphanumeric designation which is unique for each circuit. This designation is utilized in place of a reference numeral system since the alphanumeric systems tends to be systematic and whole groups of logic circuits at given logic levels can readily be referenced without necessitating a laborious recitation of a plurality of reference numerals.

It can be seen referring to FIGURE 8 that five types of enable signals are shown in the Decimal Logic Network. These enables are utilized at different times for different purposes in the various decimal operations. The following are the enables shown, 10's LOWER EN, D$\phi$ D1 SEL DEC XMTR EN, D$\phi$ D1 SEL DEC COMP EN, D$\phi$ D1 SEL DEC CORR EN, and D$\phi$D1 DEC SEL to D$\phi$ D1. Of these five, note that the latter is not used in Decimal Add or Decimal Subtract instructions. The various functions of these enables have been referred to above. (See TIMING SEQUENCE and associated description.) It will become apparent in the consideration of FIGURE 9a–FIGURE 9d that a 1 signal (see FIGURE 4 Legend) is utilized to enable the respective transfers from the Decimal Logic Network to the D$\phi$-Register and D1-Register. No limitation to a specific or logical signal configuration is in any way intended, such being a function of the particular logic circuits selected to implement the subject invention.

The OR–HFD circuits N0062, N0064, and N0066 provide a 1 output signal if any input signal is 0. Similarly N–HFD N0060 will provide 1 for a 0 input. Each of the four enable signals utilized in the decimal arithmetic operation will be described.

The 10's LOWER EN is utilized during complementing operations to cause the lowest order stage to form the 10's complement. During Decimal Add and Decimal Subtract ($sf=11$ OR 15) this enable will be utilized if one of the operands or the result must be complemented. For Decimal Add With Carry or Decimal Subtract With Borrow the lower order decimal digit is treated as 9's complement, so 10's LOWER EN is not used. OR–HFD N0066 is controlled by N1354, N1355, and N1356. These circuits must each receive all 1 input signals to provide a 0 output signal. N1356 is operative during a Decimal Complement ($sf=14$) instruction. N1355 is operative during the extended sequence to form the decimal complement if required. Its requirements are that TRIP–II–F/F be set, $sf$ of 11 OR 12 be translated, a T13 timing pulse be provided, and DC$\phi$–F/F be Clear. (See TIMING SEQUENCE.) In a similar manner N1354 is activated by the control signals applied thereto and is enabled during timing period T5.

Considering next the D$\phi$ D1 SEL DEC XMTR EN, it can be seen that N0064 is unconditionally activated by receiving an activating signal when $sf=10$ OR 13 OR 17. The other controlling input is derived from N1352. This circuit is activated by its control signals and is enabled during timing period T5 when S1–F/F is not set. It can be seen that this circuit is activated during the Decimal Add and Decimal Subtract and Decimal Add With Carry and Decimal Subtract With Borrow sequence under the condition that the Trip–II F/F is not set.

Next turning to the $D\phi$ D1 SEL DEC COMP EN, it can be seen that circuit N0062 has alternative means of activation coming from N1351 and N1353. N1353 is active during timing period T5 and N1351 is active during timing period T13. The conditions for controlling these two circuits is specified in the TIMING SEQUENCE.

Finally, considering the $D\phi$ D1 SEL EEC CORR EN, it can be seen that the inverter driver N0060 is driven directly by N1350. One of the input signals to N1350 is derived from N1357. It can be seen( therefore, that the correction factor is enabled when any decimal instruction ($sf=1X$) is active and the TRIP–II F/F is set and a timing period signal during T9 is applied to N1357. The latter condition is an unconditional switching signal for deriving the correction enable output. Alternatively, it can be seen that N1357 is activated during timing period T13 with a complement signal and when the setting of S1–F/F and DC$\phi$–F/F is such that a correction factor is required.

Turning now to a consideration of FIGURE 9a through FIGURE 9d, it will be seen that the detail logic circuitry for the remainder of the Decimal Logic Network is shown. Recalling from the consideration of FIGURE 7 wherein the Decimal Logic Network was discussed, the $D\phi$ Decimal Select 170, D1 Decimal Select 172, 9/10 Complement circuitry 190, and Decimal Correction circuitry 224 were shown as separate blocks. This separation of functions was made to facilitate a description of each of the functions, and in fact, circuitry can be considered in separate groupings as discussed. However, to economize on the utilization of the number of logic circuits required by making use of all available functions, it has been found advantageous to combine the 9/10 Complement circuitry 190 and the Decimal Correction circuitry 224 for each decimal stage.

Figure 9C:
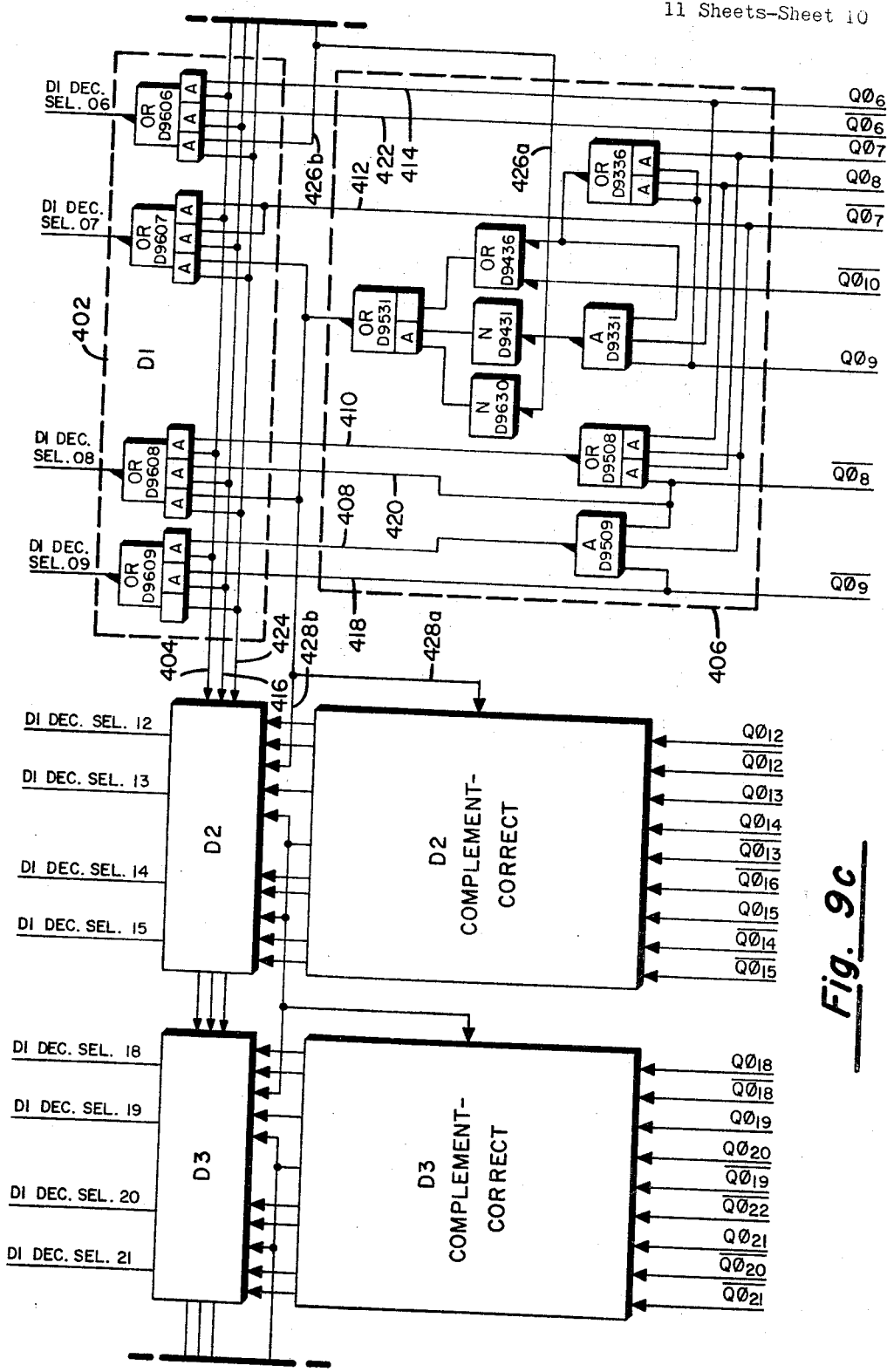
FIGURE 9 illustrates the relationship of FIGURES 9a through 9d, which together are the logic block diagram of decimal network and includes the circuitry for performing nine's complement, ten's complement and decimal correction.

Turning now to a consideration of FIGURE 9d, the output circuits shown enclosed in dashed block 400, which are comprised of D9600, D9601, D9602, and D9603 are the $D\phi$ decimal digit stage of the D1 Decimal Select circuitry 172. In FIGURE 9c the circuitry shown enclosed in dashed block 402 is the D1 Decimal select stage for the D1 decimal digit. From stage 1 through stage 9 the Decimal Select circuit combinations repeat themselves and are shown blocked in as D2 through D9 for representing decimal digits D2–D9. It can be seen that $D\phi$ through D4 of FIGURE 9 correspond to the D1 Decimal Select circuitry 172, and that D5 through D9 of FIGURE 9 correspond to the $D\phi$ Decimal Select circuitry 170. It will be noted that the circuitry shown in FIGURE 9a through FIGURE 9d do not utilize the Zone bit positions or the decimal Sign bit positions. The output signals derived from the $D\phi$ Decimal Select and D1 Decimal Select circuitry are coupled to the input circuits of the $D\phi$-Register D1-Register as described above. The enable signals (except 10's COMP EN) described in conjunction with FIGURE 8 are applied on control lines which are common to all of the stages of the $D\phi$ Decimal Select and D1 Decimal Select. Depending on which ones of the enable signals are provided, the select circuitry will pass the designated signal combinations to the $D\phi$- and D1-Registers.

Considering each of the items in order, the $D\phi$ D1 SEL DEC COMP EN is applied on line 404 (FIGURE 9d) to the $D\phi$ D1 Decimal Select circuitry. The circuitry shown on FIGURE 9c enclosed in dashed block 406 is the 9/10 Complement circuitry and the Decimal Correction factor generating circuitry for the D1 decimal digit stage. The uniform stages will be considered first with the consideration of the $D\phi$ decimal digit stage left until later, since it includes various functions that are not standard to the remainder of the Decimal Logic Network control circuitry. Considering the complement operation first, it can be seen by considering the enable line 404 that lines 408, 410, 412 and 414 are utilized in generating the 9's complement. It will be noted also that the input signals applied to the Decimal Logic Network are the true and complement values of designated stages of $A\phi$ and $Q\phi$. Therefore, in forming the 9's complement it can be seen that circuits D9509, D9508, and the direct input signals on lines 412 and 414 are the signal sources and control devices necessary for forming the 9's complement for decimal digit D1. Operation of this circuitry can readily be seen by taking an example of a binary coded decimal digit and applying the appropriate 1's and 0's to the input signal terminals and tracing the logic through to the conclusion where the 9's complemented will be generated at the D1 decimal digit output terminals. The complement operation of all higher ordered stages is similar to that of the circuitry shown in dashed block 406.

The enable signal $D\phi$ D1 SEL DEC XMIT EN on line 416 (FIGURE 9d) merely provides for a straight through transfer of the applied input digits. The logic circuitry enclosed in dashed block 406 (FIGURE 9c) does not alter or operate on the signals in any manner for the transmit operation. The transmission lines for this funtion are taken from the designated stages of $A\phi$ and $Q\phi$. For the stage shown in detail, lines 418, 420, 412 and 422 are utilized.

When the enable signal $D\phi$ D1 SEL DEC CORR EN is applied on control line 424 (FIGURE 9d), the logic circuitry operates to generate the decimal correction factor. (See Table III for correction factor definition.) It will be recalled from above, that the decimal correction factor is dependent upon the magnitude of the decimal digit applied and the condition of whether or not there is a carry from the preceding stage. In considering the Decimal Correction circuitry enclosed in dashed block 406, it can be seen that the carry signal from the stage 0 is brought in line 426a. The same carry signal is applied to the select circuits for D1 decimal digit on line 426b. The nature of the carry signal applied is actually that of the complement of the carry condition as described above. The circuits D9331, D9336, D9630, D9431, D9436, and D9531, operate on the input signals for the D1 decimal digit to provide the correction factor output from the D1 decimal digit stage select circuit. If the input decimal digit is less than 9 and a carry is received, the correction factor is 1; if the input decimal digit is equal to or greater than 9 and a carry is received, the correction factor is 7; if the input decimal digit is less than or equal to 9 and no carry is received, the correction factor is 0; and, finally, if the input decimal digit is greater than 9 and no carry is received, the correction factor is 6. The output signal from circuit D9531 is also the stage 1 carry condition which is passed on conductor 428a into the D2 Complement-Correct circuitry and on line 428b into the D2 decimal digit stage select circuitry. This operation continues on serially through the D2 through D9 stages in a similar manner.

It can be seen that the carry output signal from the D9 Complement-Correct circuitry (FIGURE 9a) on conductor 430 results in the complement of the decimal End-Off-Carry. Circiut D8634 provides a signal on line 432 which is indicative of the true End-Off-Carry and is utilized as described above.

Turning now to a consideration of FIGURE 9d, it will be recalled that for the special case the decimal digit stage $\phi$ carry is inhibited. This operation is performed by circuits D9536, D9636, D9635, and D9735. It can be seen that when the DC$\phi$–F/F is clear and S1–F/F is set control signals are applied to D9536 for inhibiting the transfer of the carry signal. Under other conditions, the carry will be allowed to propagate. (See TIMING SEQUENCE.)

On a Decimal Add With Carry or Decimal Subtract With Borrow, the circuit H0320 will be activated, and will determine whether or not a carry is injected in the D$\phi$ decimal digit stage. The Decimal Carry line to H0320 is the point of insertion of the carry from a lower ordered segment when these decimal instructions are to be executed.

The operation for the D$\phi$ decimal digit stage in response to a D$\phi$ D1 SEL XMIT EN or D$\phi$ 01 SEL DEC CORR EN is essentially the same as for decimal digit stages D1–D9. The main point of deviation in the D$\phi$ Complement-Correct stage is that the circuitry is capable of generating either the 9's complement or the 10's complement of the coded decimal digit applied thereto. When the 9's complement is called for (during Decimal Add With Carry or Decimal Subtract With Borrow) there will be a D$\phi$ D1 SEL DEC COMP EN signal on line 404. Also under such a condition, there will be no 10's LOWER EN on line 434. Therefore, circuit N0166 will provide an enable signal on line 436 to the 9's complement gate portions of the circuits in the D$\phi$ stage select circuitry 400. For the alternate condition, when a D$\phi$ D1 SEL DEC COMP EN signal is applied on line 404, and when a 10's complement is required, a 10's LOWER EN signal will be provided on line 434. The enable signal on line 434 when passed through circuit N0166 will cause a disable signal to be presented on line 436 for disabling the 9's complement path. As previously pointed out, this combination of 10's complement and 9's complement enable signal is applicable only to the D$\phi$ decimal digit stage.

The generation of the decimal correction factor in the D$\phi$ decimal digit stage is enabled by the signal on line 424 and is similar to that described above. A detailed consideration in the decimal digit D$\phi$ stage for the generation of the correction factor and of the 9's or 10's complement is not deemed necessary since the entire logic circuit is illustrated and can be followed for each condition by one skilled in the art.

Having now fully described the operation of the subject invention and having disclosed a preferred embodiment, it being understood that modifications within the scope and spirit of the invention can be made, what is desired to be protected by Letters Patent is set forth in the appended claims.

What is claimed is:

1. In a data processing system, arithmetic circuitry for selectively adding binary coded decimal operands, comprising: first and second means for receiving and at least temporarily storing signals indicative of first and second operands, each of said operands including a plurality of binary coded decimal digits; binary adder means coupled to receive in parallel said plurality of binary coded decimal digits for each of said operands for simultaneously forming in parallel a first binary sum; binary coded decimal correction means coupled to said binary adder means for generating a correction operand comprised of a predetermined decimal correction factor for each binary coded decimal digit in said first binary sum; and control means for causing said binary adder means to form in parallel a second binary sum of said first binary sum and said correction operand, said second sum indicative of the binary coded decimal sum of said first and second operands.

2. Arithmetic circuitry as in claim 1, wherein said first and second operands include a plurality of format-defining digits arranged in predetermined binary digit positions intermediate adjacent ones of said binary coded decimal digits, said circuitry further including: auxiliary storage means coupled to one of said first and second means for storing said format-defining digits; and format control means coupled to said binary adder means and said auxiliary storage means for inserting said stored format-defining digits in predetermined binary digit positions in said second binary sum.

3. Arithmetic circuitry as in claim 2, wherein said first and second operands each includes a decimal sign indicating signals, said circuitry further including: decimal sign-comparing means coupled to said first and second means for providing operand-form control signals indicative of the necessary form of one of said operands; operand form selection means coupled to said decimal sign-comparing means for alternatively selecting the true value or the decimal complement of said one of said operands for addition to the other of said operands in said binary adder means in response to said operand-form control signals; resultant form determining means coupled to said binary adder means and said decimal sign-comparing means for alternatively selecting the true value of said binary coded decimal digits in said second binary sum or the decimal complement of said binary coded decimal digits in response to said operand-form control signals.

4. Arithmetic circuitry as in claim 3 and further including arithmetic operation control means for alternatively receiving first and second programmed command signals respectively indicative of a decimal addition operand and a decimal subtraction operand, said arithmetic operation control means including circuit means for conditioning said sign-comparing means to a first mode of operation in response to said first programmed command signal and for conditioning said sign-comparing means to a second mode of operation in response to said second programmed command signal.

5. An arithmetic system as in claim 1 wherein said binary coded decimal correction means includes a plurality of input terminals arranged for receiving signal groupings indicative of decimal digit positions in said first binary sum; a plurality of circuit means associated with respective ones of said signal groupings for comparing said signal groupings to the value nine, each of said circuit means including carry input means for receiving decimal carry signals from the next adjacent lower ordered decimal digit position and carry output means for propagating decimal carry signals to the next adjacent higher ordered decimal digit position, and correction factor output means for alternatively generating a correction factor of zero when said signal grouping is less than or equal nine and no carry signal is received from said lower ordered stage, a correction factor of one when said signal grouping is less than nine and a carry signal is received from said lower ordered stage, a correction factor of six when said signal grouping is greater than nine and no carry signal is received from said lower ordered stage, and a correction factor of seven when said signal grouping is equal to or greater than nine and a carry signal is received from said lower ordered stage, said circuit means providing a carry signal at said carry output terminal when said correction factors of six and seven are generated.

6. An arithmetic system as in claim 5 and further including end-off-carry storage means having an output terminal, and an input terminal coupled to said carry output means for the highest ordered one of said circuit means for storing said end-off carry signal for use in a subsequent decimal arithmetic operation.

7. An arithmetic system as in claim 6 wherein said output terminal of said end-off-carry storage means is coupled to said carry input means for the lowest ordered one of said circuit means for injecting said end-off-carry signal in determining said correction factor determination on a subsequent binary coded decimal addition operation.

8. In a data processing system arithmetic circuitry for alternatively adding or subtracting a pair of signed decimal operands, comprising: first and second means for receiving and at least temporarily storing first and second decimal operands, each of said operands including a plurality of binary coded decimal digits and an arithmetic sign determining digit; decimal sign-comparing means coupled to said first and second means for providing a first signal when said decimal signals have a first relationship and a second signal when said decimal signs have a second relationship; operand form-selection means coupled to said first means and said decimal sign-comparing means for alternatively selecting the true value of said binary coded decimal digits in response to said first signal and the decimal complement of said binary coded decimal digits in response to said second signal; binary adder means coupled to receive said plurality of binary coded decimal digits from said second means and to said operand form-selection means for forming a first binary sum; binary coded decimal correction means coupled to said binary adder means for generating a correction operand comprised of a predetermined decimal correction factor for each binary coded decimal digit; control means for causing said binary adder means to form a second binary sum of said first binary sum and said decimal correction factor; decimal result determining means coupled to said binary adder means and said decimal sign-comparing means for alternatively selecting the true value of the binary coded decimal digits in said second binary sum or the decimal complement of said binary coded decimal digits in said second sum in response to the one of said first and second signals provided; and sign-determining means coupled to said sign-comparing means for selecting the decimal sign of the resulting binary coded decimal sum or difference operand.

9. Arithmetic circuitry as in claim 8 and further including arithmetic operation control means for alternatively receiving first or second programmed command signals indicative of decimal add operations and third or fourth command signals indicative of decimal subtract operations, said arithmetic operation control means including circuit means for conditioning said decimal sign-comparing means to an add mode of operation in response to said first or second programmed command signals and for conditioning said decimal sign-comparing means to a subtract mode of operation in response to said third or fourth programmed command signals.

10. An arithmetic system as in claim 9 wherein said binary coded decimal correction means includes a plurality of input terminals arranged for receiving signal groupings indicative of decimal digit positions in said first binary sum; a plurality of circuit means associated with respective ones of said signal groupings for comparing said signal groupings to the value nine, each of said circuit means including carry input means for receiving decimal carry signals from the next adjacent lower ordered decimal digit position and carry output means for propagating decimal carry signals to the next adjacent higher ordered decimal digit position, and correction factor output means for alternatively generating a correction factor of zero when said signal grouping is less than or equal nine and no carry signal is received from said lower ordered stage, a correction factor of one when said signal grouping is less than nine and a carry signal is received from said lower ordered stage, a correction factor of six when said signal grouping is greater than nine and no carry signal is received from said lower ordered stage, and a correction factor of seven when said signal grouping is equal to or greater than nine and a carry signal is received from said lower ordered stage, said circuit means providing a carry signal at said carry output terminal when said correction factors of six and seven are generated.

11. An arithmetic system as in claim 10 and further including end-off-carry storage means having an output terminal, and an input terminal coupled to said carry output means for the highest ordered one of said circuit means for storing said end-off-carry signal for use in a subsequent decimal arithmetic operation.

12. An arithmetic system as in claim 11 wherein said output terminal of said end-off-carry storage means is coupled to said carry input means for the lowest ordered one of said circuit means for injecting said end-off-carry signal in determining said correction factor determination on a subsequent binary coded decimal addition operation.

13. Arithmetic circuitry as in claim 12 wherein said decimal result determining means includes decimal logic network control means coupled to said arithmetic control means for receiving said programmed command signals and coupled to said end-off-carry storage means output terminal for receiving said end-off-carry carry signal, said decimal logic networks control means including transfer enable means responsive to a first combination of said programmed control signals and said end-off carry signals for providing a transfer enable signal to enable the selection of said decimal digit signal groupings and to a second combination of said programmed control signals and said end-off-carry signals for providing a complement enable signal to enable the selection of the complement of said decimal digit signal groupings.

14. Arithmetic circuitry as in claim 13, wherein said first and second operands include a plurality of format-defining digits arranged in predetermined binary digit positions intermediate adjacent ones of said binary coded decimal digits, said circuitry further including: auxiliary storage means coupled to one of said first and second means for storing said format-defining digits; and format control means coupled to said binary adder means and said auxiliary storage means for inserting said stored format-defining digits in predetermined binary digit positions in said binary coded decimal sum or difference operand.

15. In a data processing system arithmetic circuitry for alternatively adding or subtracting a pair of signed decimal operands, comprising: first and second means for receiving and at least temporarily storing first and second decimal operands, each of said operands including a plurality of binary coded decimal digits and a plurality of format-defining digits and a decimal sign digit arranged in predetermined binary digit positions; auxiliary storage means coupled to one of said first and second means for storing said decimal sign digit and said format-defining digits; decimal sign-comparing means for providing a first signal when said decimal signs have a first relationship and a second signal when said decimal signs have a second relationship; operand form-selection means coupled to said first means and said decimal sign-comparing means for alternatively selecting the true value of said binary coded decimal digits in response to said first signal and the decimal complement of said binary coded decimal digits in response to said second signal; binary adder means coupled to receive in parallel said plurality of binary coded decimal digits from said second means and to said operand form-selection means for forming in parallel the digits of a first binary sum; binary coded decimal correction means coupled to said binary adder means for generating a correction operand comprised of a predetermined decimal correction factor for each binary coded decimal digit; control means for causing said binary adder means to form in parallel a second binary sum of said first binary sum and said decimal correction factor; decimal result determining means coupled to said binary adder means and said decimal sign-comparing means for alternatively selecting the true value of the binary coded decimal digits in said second binary sum or the decimal complement of said binary coded decimal digits in said second sum in response to the one said first and second signals provided; sign-determining means coupled to said sign-comparing means for selecting the decimal sign of the resulting binary coded decimal operand; and format control means coupled to said auxiliary storage means and to said sign-determining means for combining said resultant binary coded decimal operand with said stored format-defining digits and said selected decimal sign.

16. For use with a binary arithmetic system, a decimal logic network for converting the binary arithmetic system to an arithmetic system capable of selectively adding or substracting signed binary coded decimal operands, said decimal logic network comprising: receiving means for receiving a plurality of signal groupings from intermediate storage; correction factor generating means coupled to said receiving means for generating a decimal correction factor for each of said signal groupings transmitting means coupled to said receiving means for transmitting said signal groupings; decimal complementing means coupled to said receiving means for generating the decimal complement of said signal groupings; and decimal logic network control means coupled to said correction factor generating means, said transmitting means, and said decimal complementing means for selectively activating the operation of the means coupled thereto, wherein said decimal logic network control means includes first control input means for receiving programmed control signals indicative of the arithmetic operation to be performed; second control input means for receiving timing control signals; third control input means for receiving status control signals indicative of the status of the decimal arithmetic operation in process; first circuit means having ten's complement enable output means, and input means coupled to said first, second, and third control input means for generating a ten's complement enable signal at said ten's complement output means in response to a first predetermined set of signals received at said first, second and third control input means; second circuit means having correction factor enable output means, and input means coupled to said first, second, and third control input means for generating a correction factor enable signal at said correction factor output means in response to a second predetermined set of signals received at said first, second, and third control input means; third circuit means having nine's complement output means, and input means coupled to said first, second, and third control input means for generating a nine's complement enable signal at said nine's complement output means in response to a third predetermined set of signals received at said first, second, and third control input means; and fourth circuit means having transmit output means, and input means coupled to said first, second, and third control input means for generating a transmit enable signal at said transmit output means in response to a fourth predetermined set of signals received at said first, second and third control input means.

17. A decimal logic network as in claim 16 wherein said correction factor generating means includes a plurality of fifth circuit means coupled to said receiving means, each of said fifth circuit means associated with one of said signal groupings, for comparing said signal groupings to the value nine, each of said circuit means including carry input means for receiving decimal carry signals from the next adjacent lower ordered decimal digit position and carry output means for propagating decimal carry signals to the next adjacent higher ordered decimal digit position, and correction factor output means for alternatively generating a correction factor of zero when said signal grouping is less than or equal nine and no carry signal is received from said lower ordered stage, a correction factor of one when said signal grouping is less than nine and a carry signal is received from said lower ordered stage, a correction factor of six when said signal grouping is greater than nine and no carry signal is received from said lower ordered stage, and a correction factor of seven when said signal grouping is equal to or greater than nine and a carry signal is received from said lower ordered stage, said circuit means providing a carry signal at said carry output terminal when said correction factors of six and seven are generated, said plurality of fifth circuits activated by a correction factor enable signal received from said correction factor enable output means.

18. A decimal logic network as in claim 16 wherein said decimal complementing means includes a plurality of ordered sixth circuit means coupled to said receiving means, each of said circuit means associated with one of said signal groupings for generating an output signal grouping indicative of the nine's complement of the associated signal grouping, said plurality of ordered sixth circuit means activated by a nine's complement enable signal received from said nine's complement output means.

19. A decimal logic network as in claim 18 wherein said decimal complementing means further includes seventh circuit means associated with the lowest ordered one of said plurality of ordered sixth circuit means for alternatively generating an output signal grouping indicative of the ten's complement of the associated input signal grouping when said higher ordered ones of said plurality of ordered sixth circuit means are generating said output signals indicative of said nine's complement of the associated input signal groupings, said seventh circuit means activated by a ten's complement enable signal received from said ten's complement output means.

References Cited

UNITED STATES PATENTS

| | | | |
|---|---|---|---|
| 2,928,601 | 3/1960 | Curtis | 235—169 |
| 2,938,668 | 5/1960 | Havens et al. | 235—169 |
| 2,947,479 | 8/1960 | Selmer | 235—169 |
| 2,989,237 | 6/1961 | Duke | 235—169 |
| 2,991,009 | 7/1961 | Edwards | 235—169 |
| 3,089,644 | 5/1963 | Wensley | 235—169 |
| 3,133,190 | 5/1964 | Eckert et al. | 235—159 |
| 3,278,734 | 10/1966 | Ulbtich et al. | 235—169 |
| 3,304,418 | 2/1967 | Perotto et al. | 235—169 |
| 3,426,185 | 2/1969 | Cox et al. | 235—159 X |

MALCOLM A. MORRISON, Primary Examiner

C. E. ATKINSON, Assistant Examiner

U.S. Cl. X.R.

235—168, 169, 174